(12) United States Patent
Cerny

(10) Patent No.: US 11,120,522 B2
(45) Date of Patent: Sep. 14, 2021

(54) SYSTEM AND METHOD FOR EFFICIENT MULTI-GPU RENDERING OF GEOMETRY BY SUBDIVIDING GEOMETRY

(71) Applicant: Sony Interactive Entertainment Inc., Tokyo (JP)

(72) Inventor: Mark E. Cerny, Los Angeles, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/780,864

(22) Filed: Feb. 3, 2020

(65) Prior Publication Data
US 2021/0241416 A1    Aug. 5, 2021

(51) Int. Cl.
| | |
|---|---|
| G06T 1/20 | (2006.01) |
| G06T 15/00 | (2011.01) |
| G06T 15/10 | (2011.01) |
| G06F 9/54 | (2006.01) |
| G06F 9/48 | (2006.01) |
| G06F 9/38 | (2018.01) |
| G06T 17/10 | (2006.01) |

(52) U.S. Cl.
CPC .............. *G06T 1/20* (2013.01); *G06F 9/3836* (2013.01); *G06F 9/3877* (2013.01); *G06F 9/4806* (2013.01); *G06F 9/544* (2013.01); *G06T 15/005* (2013.01); *G06T 15/10* (2013.01); *G06T 17/10* (2013.01)

(58) Field of Classification Search
CPC ......... G06T 1/20; G06T 15/005; G06T 15/10; G06F 9/4806; G06F 9/544; G06F 9/3877; G06F 9/3836; G06F 13/12
See application file for complete search history.

(56) References Cited

U.S. PATENT DOCUMENTS

| | | |
|---|---|---|
| 7,015,915 B1 | 3/2006 | Diard |
| 7,075,541 B2 | 7/2006 | Diard |
| 7,616,206 B1 | 11/2009 | Danilak |
| 7,969,444 B1 | 6/2011 | Biemann et al. |

(Continued)

OTHER PUBLICATIONS

Dong et al., "Screen Partitioning Load Balancing for Parallel Rendering on a Multi-GPU Multi-Display Workstation", Eurographics Symposium on Parallel Graphics and Visualization, 2019. (Year: 2019).

(Continued)

*Primary Examiner* — Said Broome
(74) *Attorney, Agent, or Firm* — Penilla IP, APC

(57) ABSTRACT

A method for graphics processing. The method including rendering graphics for an application using graphics processing units (GPUs). The method including using the plurality of GPUs in collaboration to render an image frame including a plurality of pieces of geometry. The method including during the rendering of the image frame, subdividing one or more of the plurality of pieces of geometry into smaller pieces, and dividing the responsibility for rendering these smaller portions of geometry among the plurality of GPUs, wherein each of the smaller portions of geometry is processed by a corresponding GPU. The method including for those pieces of geometry that are not subdivided, dividing the responsibility for rendering the pieces of geometry among the plurality of GPUs, wherein each of these pieces of geometry is processed by a corresponding GPU.

20 Claims, 19 Drawing Sheets

(56) References Cited

U.S. PATENT DOCUMENTS

| | | |
|---|---|---|
| 8,276,164 B2 | 9/2012 | Munshi et al. |
| 9,524,138 B2 | 12/2016 | Boucher et al. |
| 10,438,397 B2 | 10/2019 | Howson et al. |
| 10,679,317 B2 | 6/2020 | Kinross et al. |
| 10,699,465 B1 | 6/2020 | Surti et al. |
| 10,699,475 B1 | 6/2020 | Barczak et al. |
| 2005/0041031 A1 | 2/2005 | Diard |
| 2006/0232590 A1* | 10/2006 | Bakalash ............... G06F 9/505 345/502 |
| 2010/0007662 A1 | 1/2010 | Cox |
| 2010/0110083 A1* | 5/2010 | Paltashev ............ G06F 9/30072 345/506 |
| 2010/0289803 A1 | 11/2010 | Kiosowski et al. |
| 2011/0057935 A1 | 3/2011 | Fowler |
| 2011/0157193 A1 | 6/2011 | Boucher et al. |
| 2012/0001925 A1 | 1/2012 | Andonieh et al. |
| 2012/0162250 A1 | 6/2012 | Glen |
| 2013/0021353 A1 | 1/2013 | Drebin et al. |
| 2013/0076761 A1 | 3/2013 | Ellis et al. |
| 2013/0241938 A1 | 9/2013 | Gruber et al. |
| 2014/0347357 A1 | 11/2014 | Kim et al. |
| 2014/0354634 A1 | 12/2014 | Amsinck et al. |
| 2015/0287167 A1 | 10/2015 | Cerny |
| 2015/0363968 A1 | 12/2015 | Yang |
| 2016/0358307 A1 | 12/2016 | Brothers et al. |
| 2018/0082467 A1 | 3/2018 | Andersson et al. |
| 2018/0293776 A1 | 10/2018 | Ray et al. |
| 2018/0332252 A1 | 11/2018 | Wang et al. |
| 2018/0349204 A1 | 12/2018 | Liu et al. |
| 2019/0058799 A1 | 2/2019 | Nagabushanam |
| 2019/0139294 A1 | 5/2019 | Redshaw et al. |
| 2019/0206023 A1 | 7/2019 | Dimitrov et al. |
| 2019/0327175 A1 | 10/2019 | Ying et al. |
| 2020/0082493 A1 | 3/2020 | Wang et al. |
| 2020/0098165 A1 | 3/2020 | Gruber |
| 2020/0184712 A1 | 6/2020 | Schmalstieg et al. |
| 2020/0211260 A1 | 7/2020 | Xiao et al. |
| 2020/0211264 A1 | 7/2020 | Janus et al. |
| 2020/0211265 A1 | 7/2020 | Brownlee et al. |
| 2020/0320776 A1 | 10/2020 | Doyle et al. |

OTHER PUBLICATIONS

Inv. to Pay Addl Fees Partial Intl Search PCT/US21/16022, dated Apr. 19, 2021, 16 pages.

Inv. to Pay Addtl Fees Partial Intl Search PCT/US21/16079, dated Apr. 19, 2021, 14 pages.

\* cited by examiner

900A

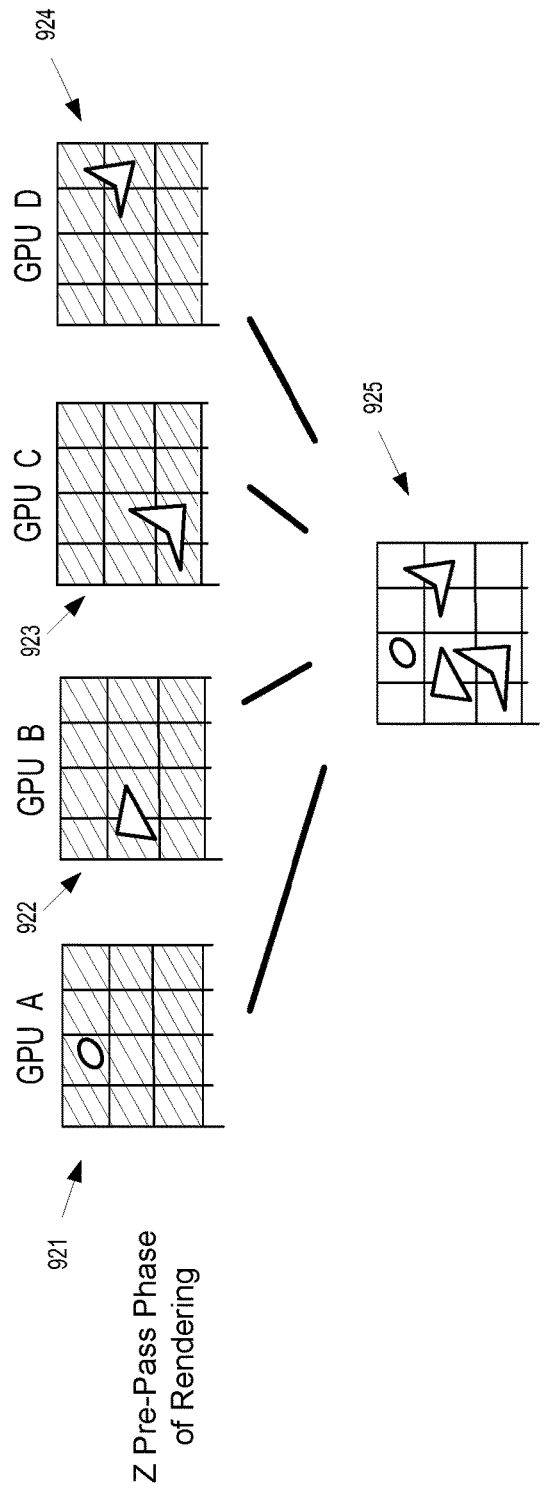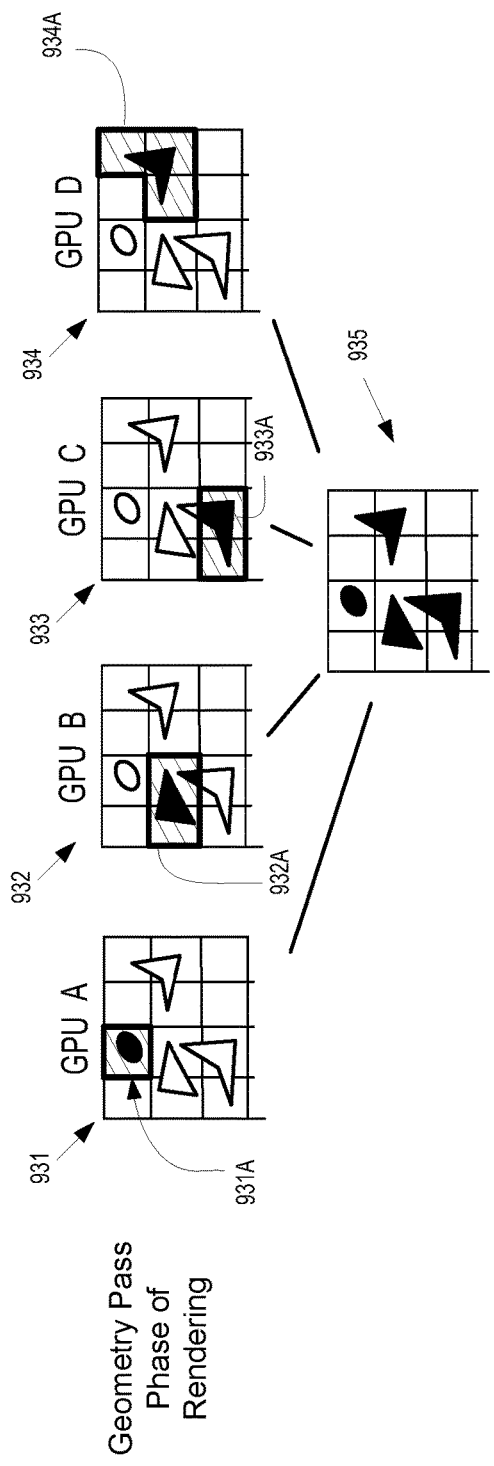

Accurate Area

Approximate Areas

SYSTEM AND METHOD FOR EFFICIENT MULTI-GPU RENDERING OF GEOMETRY BY SUBDIVIDING GEOMETRY

CROSS REFERENCE TO RELATED APPLICATIONS

This application is related to commonly assigned, co-pending U.S. patent application Ser. No. 16/780,776, entitled "SYSTEM AND METHOD FOR EFFICIENT MULTI-GPU RENDERING OF GEOMETRY BY GEOMETRY ANALYSIS WHILE RENDERING," filed concurrently with the present application, the disclosure of which is hereby incorporated by reference in its entirety. This application is related to commonly assigned, co-pending U.S. patent application Ser. No. 16/780,798, entitled "SYSTEM AND METHOD FOR EFFICIENT MULTI-GPU RENDERING OF GEOMETRY BY PERFORMING GEOMETRY ANALYSIS BEFORE RENDERING," filed concurrently with the present application, the disclosure of which is hereby incorporated by reference in its entirety.

TECHNICAL FIELD

The present disclosure is related to graphic processing, and more specifically for multi-GPU collaboration when rendering an image for an application.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to execute more complex games, the ability to network between players for multi-player gaming, sharing of assets between players, sharing of instant experiences between players and/or spectators, allowing friends to watch a friend play a video game, having a friend join the on-going game play of a friend, and the like.

The cloud gaming server may be configured to provide resources to one or more clients and/or applications. That is, the cloud gaming server may be configured with resources capable of high throughput. For example, there are limits to the performance that an individual graphics processing unit (GPU) can attain. To render even more complex scenes or use even more complex algorithms (e.g. materials, lighting, etc.) when generating a scene, it may be desirable to use multiple GPUs to render a single image. However, usage of those graphics processing units equally is difficult to achieve. Further, even though there are multiple GPUs to process an image for an application using traditional technologies, there is not the ability to support a corresponding increase in both screen pixel count and density of geometry (e.g., four GPUs cannot write four times the pixels and/or process four times the vertices or primitives for an image).

It is in this context that embodiments of the disclosure arise.

SUMMARY

Embodiments of the present disclosure relate to using multiple GPUs (graphics processing units) in collaboration to render a single image, such as multi-GPU rendering of geometry for an application by performing geometry analysis while rendering to generate information used for the dynamic assignment of screen regions to GPUs for rendering of the image frame, and/or by performing geometry analysis prior to rendering, and/or by performing a timing analysis during a rendering phase for purposes of redistributing the assignment of GPU responsibilities during the rendering phase.

Embodiments of the present disclosure disclose a method for graphics processing. The method including rendering graphics for an application using a plurality of graphics processing units (GPUs). The method including using the plurality of GPUs in collaboration to render an image frame including a plurality of pieces of geometry. The method including during a pre-pass phase of rendering, generating information at the GPUs regarding the plurality of pieces of geometry and their relation to a plurality of screen regions. The method including assigning the plurality of screen regions to the plurality of GPUs based on the information for purposes of rendering the plurality of pieces of geometry in a subsequent phase of rendering.

Other embodiments of the present disclosure disclose a computer system including a processor, and memory coupled to the processor and having stored therein instructions that, if executed by the computer system, cause the computer system to execute a method for graphics processing. The method including rendering graphics for an application using a plurality of graphics processing units (GPUs). The method including using the plurality of GPUs in collaboration to render an image frame including a plurality of pieces of geometry. The method including during a pre-pass phase of rendering, generating information at the GPUs regarding the plurality of pieces of geometry and their relation to a plurality of screen regions. The method including assigning the plurality of screen regions to the plurality of GPUs based on the information for purposes of rendering the plurality of pieces of geometry in a subsequent phase of rendering.

Still other embodiments of the present disclosure disclose a non-transitory computer-readable medium storing a computer program for graphics processing. The computer readable medium including program instructions for rendering graphics for an application using a plurality of graphics processing units (GPUs). The computer readable medium including program instructions for using the plurality of GPUs in collaboration to render an image frame including a plurality of pieces of geometry. The computer readable medium including program instructions for during a pre-pass phase of rendering, generating information at the GPUs regarding the plurality of pieces of geometry and their relation to a plurality of screen regions. The computer readable medium including program instructions for assigning the plurality of screen regions to the plurality of GPUs based on the information for purposes of rendering the plurality of pieces of geometry in a subsequent phase of rendering.

Embodiments of the present disclosure disclose a method for graphics processing. The method including rendering graphics for an application using a plurality of graphics processing units (GPUs). The method including dividing responsibility for processing a plurality of pieces of geometry of an image frame during an analysis pre-pass phase of rendering between the plurality of GPUs, wherein each of the plurality of pieces of geometry is assigned to a corresponding GPU. The method including determining in the analysis pre-pass phase overlap of each the plurality of pieces of geometry with each of a plurality of screen regions. The method including generating information at the plurality of GPUs regarding the plurality of pieces of geometry and their relations to the plurality of screen regions based on the overlap of each the plurality of pieces of geometry with each of the plurality of screen regions. The method including assigning the plurality of screen regions to the plurality of GPUs based on the information for purposes of rendering the plurality of pieces of geometry during a subsequent phase of rendering.

Other embodiments of the present disclosure disclose a computer system including a processor, and memory coupled to the processor and having stored therein instructions that, if executed by the computer system, cause the computer system to execute a method for graphics processing. The method including rendering graphics for an application using a plurality of graphics processing units (GPUs). The method including dividing responsibility for processing a plurality of pieces of geometry of an image frame during an analysis pre-pass phase of rendering between the plurality of GPUs, wherein each of the plurality of pieces of geometry is assigned to a corresponding GPU. The method including determining in the analysis pre-pass phase overlap of each the plurality of pieces of geometry with each of a plurality of screen regions. The method including generating information at the plurality of GPUs regarding the plurality of pieces of geometry and their relations to the plurality of screen regions based on the overlap of each the plurality of pieces of geometry with each of the plurality of screen regions. The method including assigning the plurality of screen regions to the plurality of GPUs based on the information for purposes of rendering the plurality of pieces of geometry during a subsequent phase of rendering.

Still other embodiments of the present disclosure disclose a non-transitory computer-readable medium storing a computer program for graphics processing. The computer readable medium including program instructions for rendering graphics for an application using a plurality of graphics processing units (GPUs). The computer readable medium including program instructions for dividing responsibility for processing a plurality of pieces of geometry of an image frame during an analysis pre-pass phase of rendering between the plurality of GPUs, wherein each of the plurality of pieces of geometry is assigned to a corresponding GPU. The computer readable medium including program instructions for determining in the analysis pre-pass phase overlap of each the plurality of pieces of geometry with each of a plurality of screen regions. The computer readable medium including program instructions for generating information at the plurality of GPUs regarding the plurality of pieces of geometry and their relations to the plurality of screen regions based on the overlap of each the plurality of pieces of geometry with each of the plurality of screen regions. The computer readable medium including program instructions for assigning the plurality of screen regions to the plurality of GPUs based on the information for purposes of rendering the plurality of pieces of geometry during a subsequent phase of rendering.

Embodiments of the present disclosure disclose a method for graphics processing. The method including rendering graphics for an application using a plurality of graphics processing units (GPUs). The method including using the plurality of GPUs in collaboration to render an image frame including a plurality of pieces of geometry. The method including during the rendering of the image frame, subdividing one or more of the plurality of pieces of geometry into smaller pieces, and dividing the responsibility for rendering these smaller portions of geometry among the plurality of GPUs, wherein each of the smaller portions of geometry is processed by a corresponding GPU. The method including for those pieces of geometry that are not subdivided, dividing the responsibility for rendering the pieces of geometry among the plurality of GPUs, wherein each of these pieces of geometry is processed by a corresponding GPU.

Other embodiments of the present disclosure disclose a computer system including a processor, and memory coupled to the processor and having stored therein instructions that, if executed by the computer system, cause the computer system to execute a method for graphics processing. The method including rendering graphics for an application using a plurality of graphics processing units (GPUs). The method including using the plurality of GPUs in collaboration to render an image frame including a plurality of pieces of geometry. The method including during the rendering of the image frame, subdividing one or more of the plurality of pieces of geometry into smaller pieces, and dividing the responsibility for rendering these smaller portions of geometry among the plurality of GPUs, wherein each of the smaller portions of geometry is processed by a corresponding GPU. The method including for those pieces of geometry that are not subdivided, dividing the responsibility for rendering the pieces of geometry among the plurality of GPUs, wherein each of these pieces of geometry is processed by a corresponding GPU.

Still other embodiments of the present disclosure disclose a non-transitory computer-readable medium storing a computer program for graphics processing. The computer readable medium including program instructions for rendering graphics for an application using a plurality of graphics processing units (GPUs). The computer readable medium including program instructions for using the plurality of GPUs in collaboration to render an image frame including a plurality of pieces of geometry. The computer readable medium including program instructions for during the rendering of the image frame, subdividing one or more of the plurality of pieces of geometry into smaller pieces, and dividing the responsibility for rendering these smaller portions of geometry among the plurality of GPUs, wherein each of the smaller portions of geometry is processed by a corresponding GPU. The computer readable medium including program instructions for for those pieces of geometry that are not subdivided, dividing the responsibility for rendering the pieces of geometry among the plurality of GPUs, wherein each of these pieces of geometry is processed by a corresponding GPU.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIGS. 9A-9C are diagrams illustrating the rendering of an image frame including four objects including a Z pre-pass phase and a geometry phase of rendering an image frame, the Z pre-pass phase performed for generating information used for the dynamic assignment of screen regions to GPUs for geometry rendering of the image frame, in accordance with one embodiment of the present disclosure.

DETAILED DESCRIPTION

Figure 1:
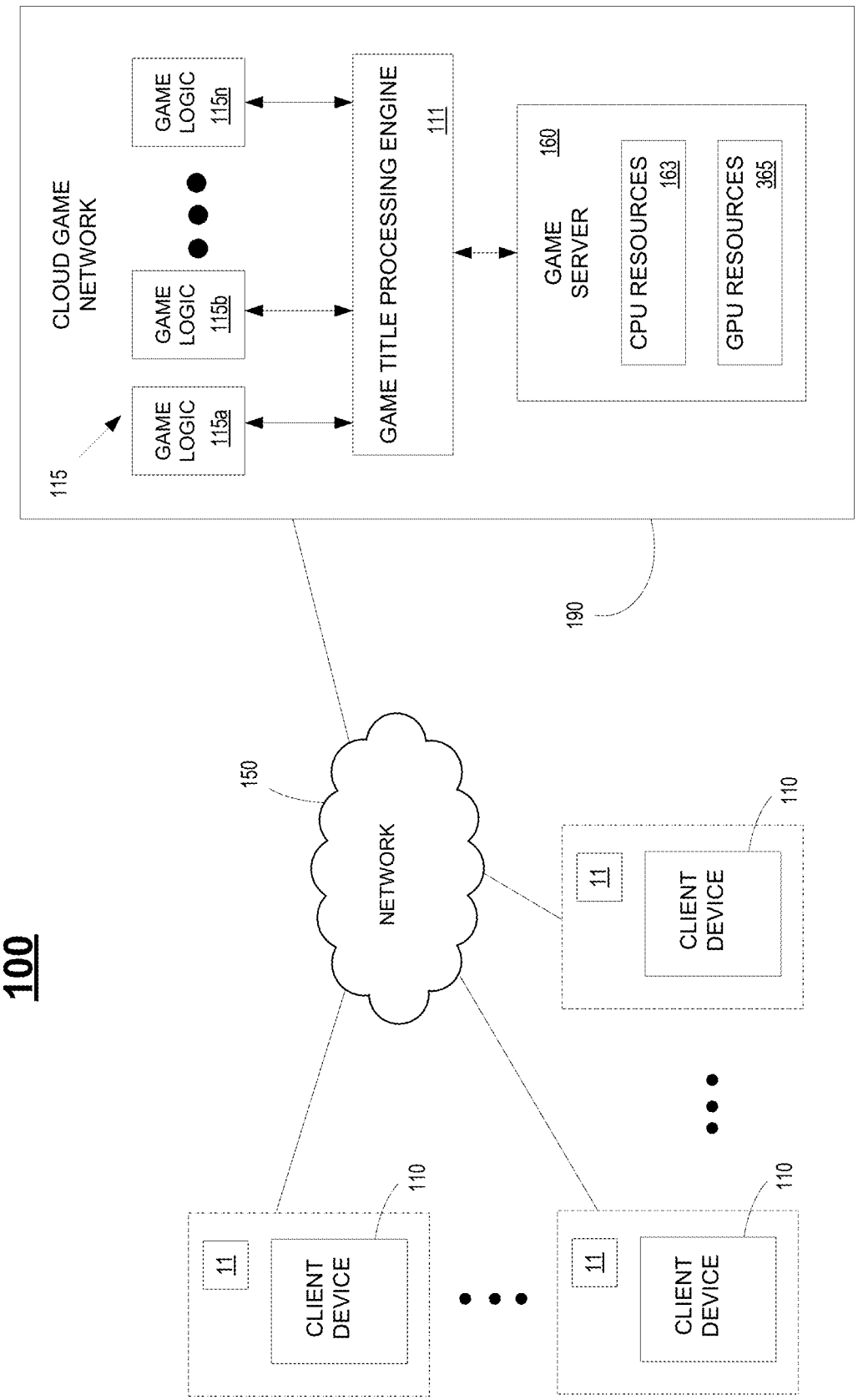
FIG. 1 is a diagram of a system for providing gaming over a network between one or more cloud gaming servers configured for implementing multiple GPUs in collaboration to render a single image, including multi-GPU (graphics processing unit) rendering of geometry for an application by performing geometry analysis while rendering to generate information used for the dynamic assignment of screen regions to GPUs for further rendering passes of the image frame, and/or by performing geometry analysis prior to a rendering phase, and/or by subdividing pieces of geometry and assigning the resulting smaller portions of geometry to multiple GPUs, in accordance with embodiments of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, there are limits to the performance that an individual GPU can attain, e.g. deriving from the limits on how large the GPU can be. To render even more complex scenes or use even more complex algorithms (e.g. materials, lighting, etc.) it is desirable to use multiple GPUs in collaboration to generate and/or render a single image frame. For example, responsibility for rendering is divided between a plurality of the GPUs based on information determined from geometry analysis of objects and/or pieces of geometry (e.g., portions of objects, primitives, polygons, vertices, etc.) in the image frame. The information provides relationships between geometry and each of the screen regions, which may be interleaved. This allows the GPUs to more efficiently render the geometry or avoid rendering it altogether. In particular, various embodiments of the present disclosure provide for the analysis of geometry of an image frame, and dynamically and flexibly assigning responsibilities between the GPUs for rendering the image frame, such that each GPU ends up being responsible for a set of screen regions that are unique for that image frame (i.e., the next image frame may have a different association of GPUs to screen regions). Through geometry analysis and dynamic assignment of rendering responsibilities to GPUs per image frame, embodiments of the present disclosure support an increase in pixel count (i.e. resolution) and complexity, and/or an increase in geometric complexity, and/or an increase in the amount of processing per vertex and/or primitive. Specifically, various embodiments of the present disclosure describe methods and systems configured for performing multi-GPU rendering of geometry for an application by performing geometry analysis while rendering to dynamically assign screen regions to GPUs for geometry rendering of the image frame, wherein the geometry analysis is based on information defining relationships between the geometry to be rendered for the image frame and screen regions. For example, the information for the geometry analysis is generated while rendering, such as during a Z pre-pass before the geometry rendering. In particular, hardware is configured so that a pre-pass generates the information used to assist in intelligent assignment of screen regions to the GPUs when performing geometry a subsequent phase of rendering. Other embodiments of the present disclosure describe methods and systems configured for performing multi-GPU rendering of geometry for an application by performing geometry analysis prior to a phase of rendering, in order to dynamically assign screen regions to GPUs for that phase of rendering of the image frame, wherein the geometry analysis is based on information defining relationships between the geometry to be rendered for the image frame and screen regions. For example, the information is generated in a pre-pass performed before rendering, such as using shaders (e.g., software). The information is used for the intelligent assignment of screen regions to the GPUs when performing the geometry rendering. Still other embodiments of the present disclosure describe methods and system configured for subdividing pieces of geometry, e.g. as processed or produced by draw calls, into smaller portions of geometry, and assigning those smaller portions of geometry to multiple GPUs for rendering, wherein each smaller portion of geometry is assigned to a GPU. As an advantage, for example this allows the multiple GPUs to render more complex scenes and/or images in the same amount of time.

With the above general understanding of the various embodiments, example details of the embodiments will now be described with reference to the various drawings.

Throughout the specification, the reference to "application" or "game" or "video game" or "gaming application" is meant to represent any type of interactive application that is directed through execution of input commands. For illustration purposes only, an interactive application includes applications for gaming, word processing, video processing, video game processing, etc. Further, the terms introduced above are interchangeable.

Throughout the specification, various embodiments of the present disclosure are described for multi-GPU processing or rendering of geometry for an application using an exemplary architecture having four GPUs. However, it is understood that any number of GPUs (e.g., two or more GPUs) may collaborate when rendering geometry for an application.

FIG. 1 is a diagram of a system for performing multi-GPU processing when rendering an image (e.g. image frame) for an application, in accordance with one embodiment of the present disclosure. The system is configured to provide gaming over a network between one or more cloud gaming servers, and more specifically is configured for the collaboration of multiple GPUs to render a single image of an application, such as when performing geometry analysis of pieces of geometry of an image frame while rendering or prior to rendering in order to dynamically assign screen regions to GPUs for geometry rendering of the image frame, and/or when subdividing pieces of geometry, e.g. as processed or produced by draw calls, into smaller portions of geometry, and assigning those smaller portions of geometry to multiple GPUs for rendering, wherein each smaller portion of geometry is assigned to a GPU, in accordance with embodiments of the present disclosure. Cloud gaming includes the execution of a video game at the server to generate game rendered video frames, which are then sent to a client for display. In particular, system 100 is configured for efficient multi-GPU rendering of geometry for an application by pretesting against interleaved screen regions before rendering.

Although FIG. 1 illustrates the implementation of multi-GPU rendering of geometry between one or more cloud gaming servers of a cloud gaming system, other embodiments of the present disclosure provide for efficient multi-GPU rendering of geometry for an application by performing region testing while rendering within a stand-alone system, such as a personal computer or gaming console that includes a high-end graphics card having multiple GPUs.

It is also understood that the multi-GPU rendering of geometry may be performed using physical GPUs, or virtual GPUs, or a combination of both, in various embodiments (e.g. in a cloud gaming environment or within a stand-alone system). For example, virtual machines (e.g. instances) may be created using a hypervisor of a host hardware (e.g. located at a data center) utilizing one or more components of a hardware layer, such as multiple CPUs, memory modules, GPUs, network interfaces, communication components, etc. These physical resources may be arranged in racks, such as racks of CPUs, racks of GPUs, racks of memory, etc., wherein the physical resources in the racks may be accessed using top of rack switches facilitating a fabric for assembling and accessing of components used for an instance (e.g. when building the virtualized components of the instance). Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc. In addition, a configuration of an instance that may be transferred from one data center to another data center to reduce latency. GPU utilization defined for the user or game can be utilized when saving a user's gaming session. The GPU utilization can include any number of configurations described herein to optimize the fast rendering of video frames for a gaming session. In one embodiment, the GPU utilization defined for the game or the user can be transferred between data centers as a configurable setting. The ability to transfer the GPU utilization setting enables for efficient migration of game play from data center to data center in case the user connects to play games from different geo locations.

System 100 provides gaming via a cloud game network 190, wherein the game is being executed remote from client device 110 (e.g. thin client) of a corresponding user that is playing the game, in accordance with one embodiment of the present disclosure. System 100 may provide gaming control to one or more users playing one or more games through the cloud game network 190 via network 150 in either single-player or multi-player modes. In some embodiments, the cloud game network 190 may include a plurality of virtual machines (VMs) running on a hypervisor of a host machine, with one or more virtual machines configured to execute a game processor module utilizing the hardware resources available to the hypervisor of the host. Network 150 may include one or more communication technologies. In some embodiments, network 150 may include $5^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the cloud game network 190 includes a game server 160 that provides access to a plurality of video games. Game server 160 may be any type of server computing device available in the cloud, and may be configured as one or more virtual machines executing on one or more hosts. For example, game server 160 may manage a virtual machine supporting a game processor that instantiates an instance of a game for a user. As such, a plurality of game processors of game server 160 associated with a plurality of virtual machines is configured to execute multiple instances of one or more games associated with gameplays of a plurality of users. In that manner, back-end server support provides streaming of media (e.g. video, audio, etc.) of gameplays of a plurality of gaming applications to a plurality of corresponding users. That is, game server 160 is configured to stream data (e.g. rendered images and/or frames of a corresponding gameplay) back to a corresponding client device 110 through network 150. In that manner, a computationally complex gaming application may be executing at the back-end server in response to controller inputs received and forwarded by client device 110. Each server is able to render images and/or frames that are then encoded (e.g. compressed) and streamed to the corresponding client device for display.

For example, a plurality of users may access cloud game network 190 via communication network 150 using corresponding client devices 110 configured for receiving streaming media. In one embodiment, client device 110 may be configured as a thin client providing interfacing with a back end server (e.g. cloud game network 190) configured for providing computational functionality (e.g. including game title processing engine 111). In another embodiment, client device 110 may be configured with a game title processing engine and game logic for at least some local processing of a video game, and may be further utilized for receiving streaming content as generated by the video game executing at a back-end server, or for other content provided by back-end server support. For local processing, the game title processing engine includes basic processor based functions for executing a video game and services associated with the video game. In that case, the game logic may be stored on the local client device 110 and is used for executing the video game.

Each of the client devices 110 may be requesting access to different games from the cloud game network. For example, cloud game network 190 may be executing one or more game logics that are built upon a game title processing engine 111, as executed using the CPU resources 163 and GPU resources 365 of the game server 160. For instance, game logic 115a in cooperation with game title processing engine 111 may be executing on game server 160 for one client, game logic 115b in cooperation with game title processing engine 111 may be executing on game server 160 for a second client, . . . and game logic 115n in cooperation with game title processing engine 111 may be executing on game server 160 for an Nth client.

In particular, client device 110 of a corresponding user (not shown) is configured for requesting access to games over a communication network 150, such as the internet, and for rendering for display images (e.g. image frame) generated by a video game executed by the game server 160, wherein encoded images are delivered to the client device 110 for display in association with the corresponding user. For example, the user may be interacting through client device 110 with an instance of a video game executing on game processor of game server 160. More particularly, an instance of the video game is executed by the game title processing engine 111. Corresponding game logic (e.g. executable code) 115 implementing the video game is stored and accessible through a data store (not shown), and is used to execute the video game. Game title processing engine 111 is able to support a plurality of video games using a plurality of game logics (e g gaming application), each of which is selectable by the user.

For example, client device 110 is configured to interact with the game title processing engine 111 in association with the gameplay of a corresponding user, such as through input commands that are used to drive gameplay. In particular, client device 110 may receive input from various types of input devices, such as game controllers, tablet computers, keyboards, gestures captured by video cameras, mice, touch pads, etc. Client device 110 can be any type of computing device having at least a memory and a processor module that is capable of connecting to the game server 160 over network 150. The back-end game title processing engine 111 is configured for generating rendered images, which is delivered over network 150 for display at a corresponding display in association with client device 110. For example, through cloud based services the game rendered images may be delivered by an instance of a corresponding game (e.g. game logic) executing on game executing engine 111 of game server 160. That is, client device 110 is configured for receiving encoded images (e.g. encoded from game rendered images generated through execution of a video game), and for displaying the images that are rendered on display 11. In one embodiment, display 11 includes an HMD (e.g. displaying VR content). In some embodiments, the rendered images may be streamed to a smartphone or tablet, wirelessly or wired, direct from the cloud based services or via the client device 110 (e.g. PlayStation® Remote Play).

In one embodiment, game server 160 and/or the game title processing engine 111 includes basic processor based functions for executing the game and services associated with the gaming application. For example, game server 160 includes central processing unit (CPU) resources 163 and graphics processing unit (GPU) resources 365 that are configured for performing processor based functions include 2D or 3D rendering, physics simulation, scripting, audio, animation, graphics processing, lighting, shading, rasterization, ray tracing, shadowing, culling, transformation, artificial intelligence, etc. In addition, the CPU and GPU group may implement services for the gaming application, including, in part, memory management, multi-thread management, quality of service (QoS), bandwidth testing, social networking, management of social friends, communication with social networks of friends, communication channels, texting, instant messaging, chat support, etc. In one embodiment, one or more applications share a particular GPU resource. In one embodiment, multiple GPU devices may be combined to perform graphics processing for a single application that is executing on a corresponding CPU.

In one embodiment, cloud game network 190 is a distributed game server system and/or architecture. In particular, a distributed game engine executing game logic is configured as a corresponding instance of a corresponding game. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network 190, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g. video frames, audio, etc.) for the gaming application in response to controller input by a player. The distribution synchronization layer is able to efficiently execute (e.g. through load balancing) those functions across the distributed processing entities, such that critical game engine components/functions are distributed and reassembled for more efficient processing.

Figure 2:
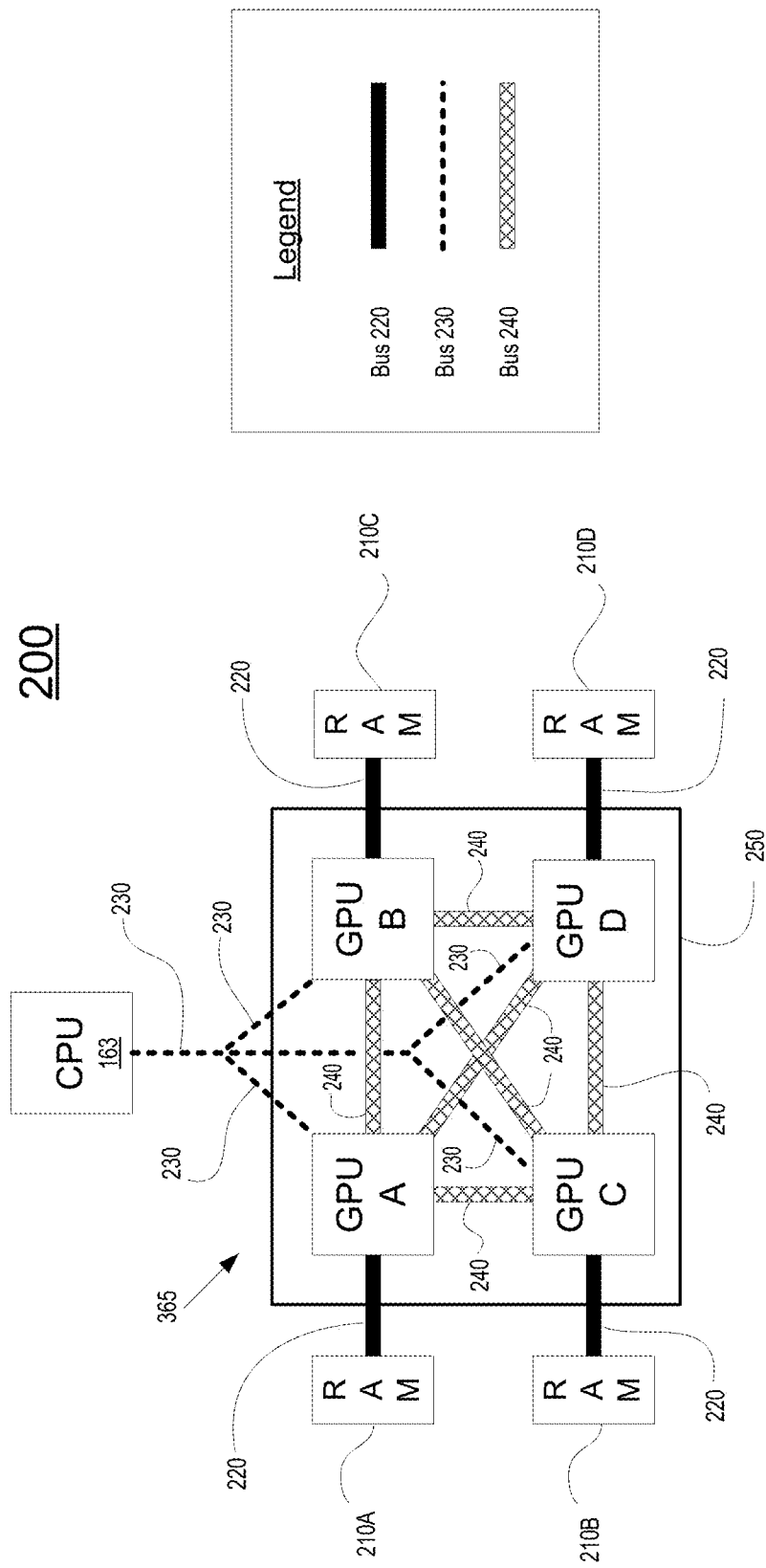
FIG. 2 is a diagram of a multi-GPU architecture wherein multiple GPUs collaborate to render a single image, in accordance with one embodiment of the present disclosure.

FIG. 2 is a diagram of an exemplary multi-GPU architecture 200 wherein multiple GPUs collaborate to render a single image of a corresponding application, in accordance with one embodiment of the present disclosure. The multi-GPU architecture 200 is configured to perform geometry analysis of pieces of geometry of an image frame while rendering or prior to rendering in order to dynamically assign screen regions to GPUs for geometry rendering of the image frame, and/or when subdividing pieces of geometry, e.g. as processed or produced by draw calls, into smaller portions of geometry, and assigning those smaller portions of geometry to multiple GPUs for rendering, wherein each smaller portion of geometry is assigned to a GPU, in accordance with various embodiments of the present disclosure. It is understood that many architectures are possible in various embodiments of the present disclosure in which multiple GPUs collaborate to render a single image though not explicitly described or shown. For example, multi-GPU rendering of geometry for an application by performing region testing while rendering may be implemented between one or more cloud gaming servers of a cloud gaming system, or may be implemented within a stand-alone system, such as a personal computer or gaming console that includes a high-end graphics card having multiple GPUs, etc.

The multi-GPU architecture 200 includes a CPU 163 and multiple GPUs configured for multi-GPU rendering of a single image (also referred to as "image frame") for an application, and/or each image in a sequence of images for the application. In particular, CPU 163 and GPU resources 365 are configured for performing processor based functions include 2D or 3D rendering, physics simulation, scripting, audio, animation, graphics processing, lighting, shading, rasterization, ray tracing, shadowing, culling, transformation, artificial intelligence, etc., as previously described.

For example, four GPUs are shown in GPU resources 365 of the multi-GPU architecture 200, though any number of GPUs may be utilized when rendering images for an application. Each GPU is connected via a high speed bus 220 to a corresponding dedicated memory, such as random access memory (RAM). In particular, GPU-A is connected to memory 210A (e.g., RAM) via bus 220, GPU-B is connected to memory 210B (e.g., RAM) via bus 220, GPU-C is connected to memory 210C (e.g., RAM) via bus 220, and GPU-D is connected to memory 210D (e.g., RAM) via bus 220.

Further, each GPU is connected to each other via bus 240 that depending on the architecture may be approximately equal in speed or slower than bus 220 used for communication between a corresponding GPU and its corresponding memory. For example, GPU-A is connected to each of GPU-B, GPU-C, and GPU-D via bus 240. Also, GPU-B is connected to each of GPU-A, GPU-C, and GPU-D via bus 240. In addition, GPU-C is connected to each of GPU-A, GPU-B, and GPU-D via bus 240. Further, GPU-D is connected to each of GPU-A, GPU-B, and GPU-C via bus 240.

CPU 163 connects to each of the GPUs via a lower speed bus 230 (e.g., bus 230 is slower than bus 220 used for communication between a corresponding GPU and its corresponding memory). In particular, CPU 163 is connected to each of GPU-A, GPU-B, GPU-C, and GPU-D.

Figure 4:
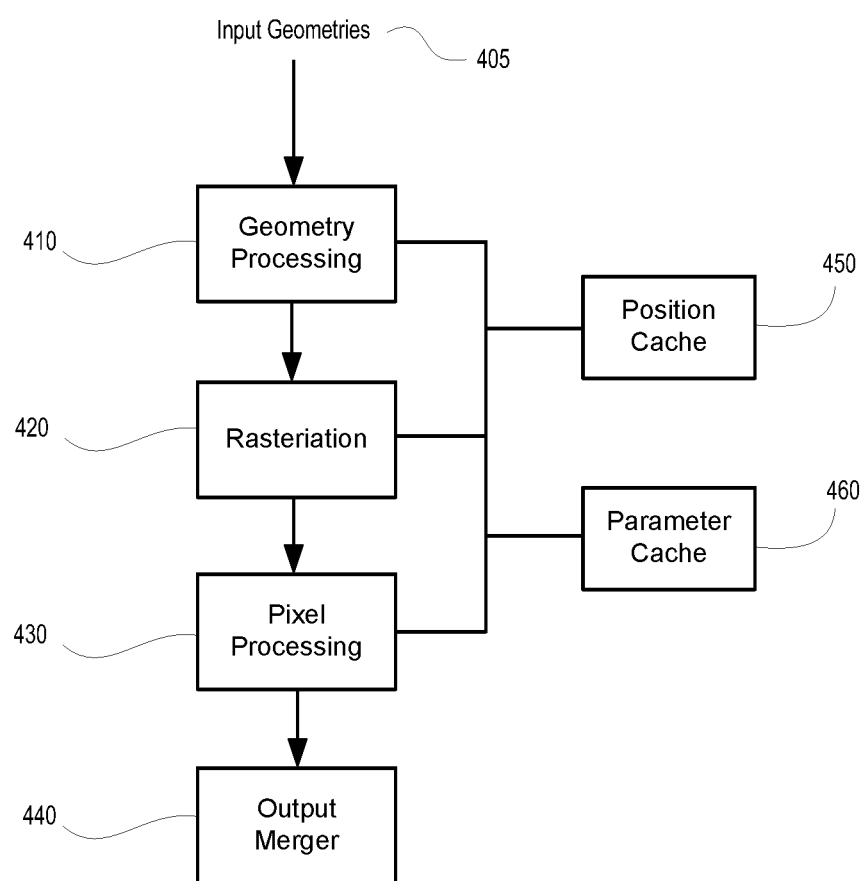
FIG. 4 is a diagram of a rendering architecture implementing a graphics pipeline that is configured for multi-GPU processing, such that multiple GPUs collaborate to render a single image, in accordance with one embodiment of the present disclosure.

In some embodiments, the four GPUs are discrete GPUs, each on their own silicon die. In other embodiments, the four GPUs may share a die in order to take advantage of high speed interconnects and other units on the die. In yet other embodiments, there is one physical GPU 250 that can be configured to be used either as a single more powerful GPU or as four less powerful "virtual" GPUs (GPU-A, GPU-B, GPU-C and GPU-D). That is to say, there is sufficient functionality for GPU-A, GPU-B, GPU-C and GPU-D each to operate a graphics pipeline (as shown in FIG. 4), and the chip as a whole can operate a graphics pipeline (as shown in FIG. 4), and the configuration can be flexibly switched (e.g. between rendering passes) between the two configurations.

Figure 3:
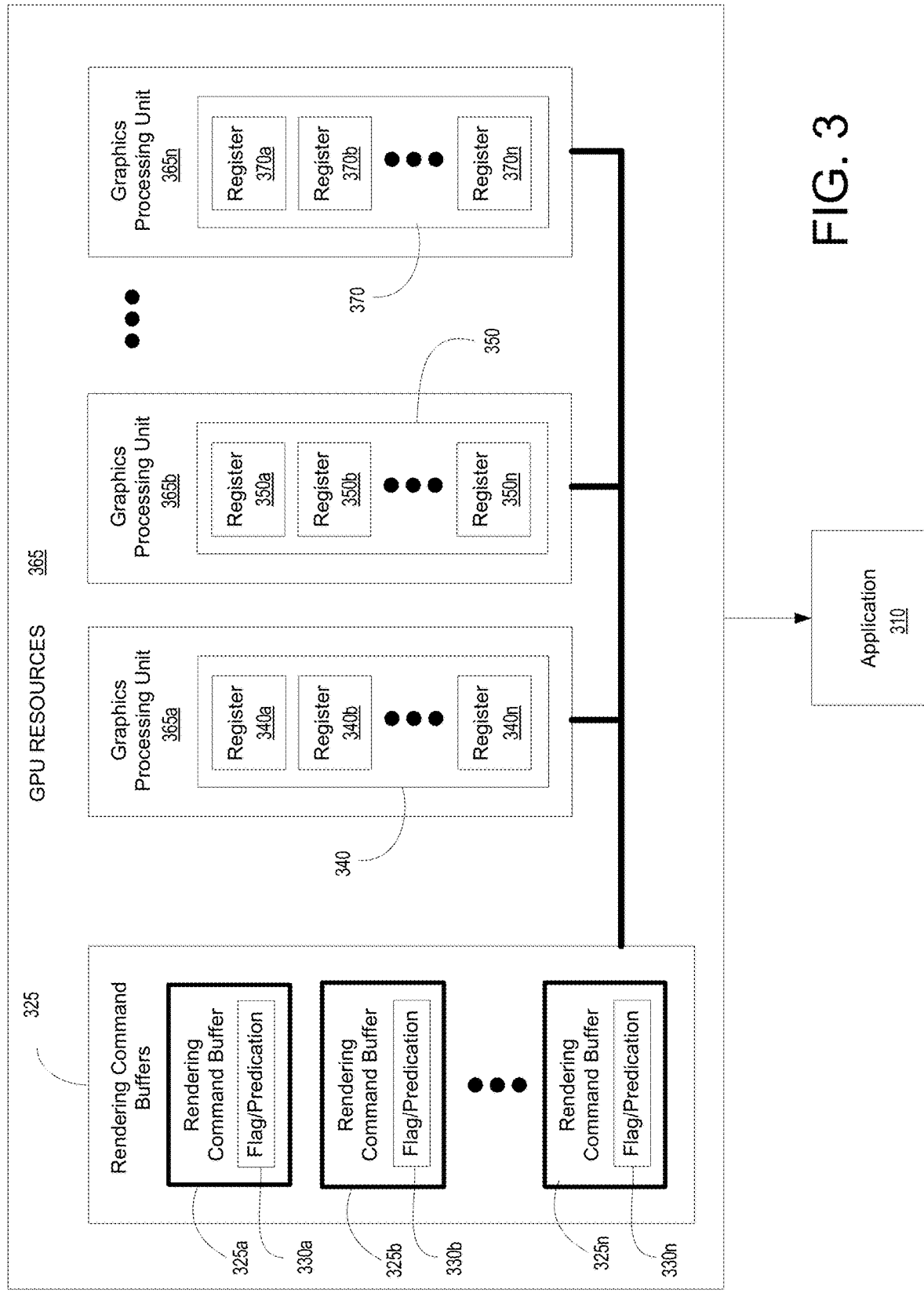
FIG. 3 is a diagram of multiple graphics processing unit resources configured for multi-GPU rendering of geometry for an application by performing geometry analysis while rendering, and/or by performing geometry analysis prior to rendering, and/or by subdividing pieces of geometry and assigning the resulting smaller portions of geometry to multiple GPUs, in accordance with embodiments of the present disclosure.

FIG. 3 is a diagram of graphics processing unit resources 365 configured for multi-GPU rendering of geometry for an image frame generated by an application by performing geometry analysis of pieces of geometry of an image frame while rendering or prior to rendering in order to dynamically assign screen regions to GPUs for geometry rendering of the image frame, and/or when subdividing pieces of geometry, e.g. as processed or produced by draw calls, into smaller portions of geometry, and assigning those smaller portions of geometry to multiple GPUs for rendering, wherein each smaller portion of geometry is assigned to a GPU, in accordance with various embodiments of the present disclosure. For example, game server 160 may be configured to include GPU resources 365 in the cloud game network 190 of FIG. 1. As shown, GPU resources 365 includes multiple GPUs, such as GPU 365a, GPU 365b GPU 365n. As previously described, various architectures may include multiple GPUs collaborating to render a single image by performing multi-GPU rendering of geometry for an application through region testing while rendering, such as implementing multi-GPU rendering of geometry between one or more cloud gaming servers of a cloud gaming system, or implementing multi-GPU rendering of geometry within a stand-alone system, such as a personal computer or gaming console that includes a high-end graphics card having multiple GPUs, etc.

In particular, in one embodiment, game server 160 is configured to perform multi-GPU processing when rendering a single image of an application, such that multiple GPUs collaborate to render a single image, and/or render each of one or more images of a sequence of images when executing an application. For example, game server 160 may include a CPU and GPU group that is configured to perform multi-GPU rendering of each of one or more images in a sequence of images of the application, wherein one CPU and GPU group could be implementing graphics and/or rendering pipelines for the application, in one embodiment. The CPU and GPU group could be configured as one or more processing devices. As previously described, the GPU and GPU group may include CPU 163 and GPU resources 365, which are configured for performing processor based functions include 2D or 3D rendering, physics simulation, scripting, audio, animation, graphics processing, lighting, shading, rasterization, ray tracing, shadowing, culling, transformation, artificial intelligence, etc.

GPU resources 365 are responsible and/or configured for rendering of objects (e.g. writing color or normal vector values for a pixel of the object to multiple render targets—MRTs) and for execution of synchronous compute kernels (e.g. full screen effects on the resulting MRTs); the synchronous compute to perform, and the objects to render are specified by commands contained in multiple rendering command buffers 325 that the GPU will execute. In particular, GPU resources 365 is configured to render objects and perform synchronous compute (e.g. during the execution of synchronous compute kernels) when executing commands from the rendering command buffers 325, wherein commands and/or operations may be dependent on other operations such that they are performed in sequence.

For example, GPU resources 365 are configured to perform synchronous compute and/or rendering of objects using one or more rendering command buffers 325 (e.g. rendering command buffer 325a, rendering buffer 325b ... rendering command buffer 325n). Each GPU in the GPU resources 365 may have their own command buffer, in one embodiment. Alternatively, when substantially the same set of objects are being rendered by each GPU (e.g., due to small size of the regions), the GPUs in GPU resources 365 may use the same command buffer or the same set of command buffers. Further, each of the GPUs in GPU resources 365 may support the ability for a command to be executed by one GPU, but not by another. For instance, flags on a draw command or predication in the rendering command buffer allows a single GPU to execute one or more commands in the corresponding command buffer, while the other GPUs will ignore the commands. For example, rendering command buffer 325a may support flags 330a, rendering command buffer 325b support flags 330b ... rendering command buffer 325n may support flags 330n.

Performance of synchronous compute (e.g. execution of synchronous compute kernels) and rendering of objects are part of the overall rendering. For example, if the video game is running at 60 Hz (e.g. 60 frames per second), then all object rendering and execution of synchronous compute kernels for an image frame typically must complete within approximately 16.67 ms (e.g. one frame at 60 Hz). As previously described, operations performed when rendering objects and/or executing synchronous compute kernels are ordered, such that operations may be dependent on other operations (e.g. commands in a rendering command buffer may need to complete execution before other commands in that rendering command buffer can execute).

In particular, each of the rendering command buffers 325 contains commands of various types, including commands that affect a corresponding GPU configuration (e.g. commands that specify the location and format of a render target), as well as commands to render objects and/or execute synchronous compute kernels. For purposes of illustration, synchronous compute performed when executing synchronize compute kernels may include performing full screen effects when the objects have all been rendered to one or more corresponding multiple render targets (MRTs).

In addition, when GPU resources 365 render objects for an image frame, and/or execute synchronous compute kernels when generating the image frame, the GPU resources 365 are configured via the registers of each GPU 365a, 365b ... 365n. For example, GPU 365a is configured via its registers 340 (e.g. register 340a, register 340b ... register 340n) to perform that rendering or compute kernel execution in a certain way. That is, the values stored in registers 340 define the hardware context (e.g. GPU configuration or GPU state) for GPU 365a 365 when executing commands in rendering command buffers 325 used for rendering objects and/or executing synchronous compute kernels for an image frame. Each of the GPUs in GPU resources 365 may be similarly configured, such that GPU 365b is configured via its registers 350 (e.g., register 350a, register 350b ... register 350n) to perform that rendering or compute kernel execution in a certain way; ... and GPU 365n is configured via its registers 370 (e.g., register 370a, register 370b ... register 370n) to perform that rendering or compute kernel execution in a certain way.

Some examples of GPU configuration include the location and format of render targets (e.g. MRTs). Also, other examples of GPU configuration include operating procedures. For instance, when rendering an object, the Z-value of each pixel of the object can be compared to the Z-buffer in various ways. For example, the object pixel is written only if the object Z-value matches the value in the Z-buffer.

Alternatively, the object pixel could be written only if the object Z-value is the same or less than the value in the Z-buffer. The type of test being performed is defined within the GPU configuration.

FIG. 4 is a simplified diagram of a rendering architecture implementing a graphics pipeline 400 that is configured for multi-GPU processing, such that multiple GPUs collaborate to render a single image, in accordance with one embodiment of the present disclosure. The graphics pipeline 400 is illustrative of the general process for rendering images using 3D (three dimensional) polygon rendering processes. The graphics pipeline 400 for a rendered image outputs corresponding color information for each of the pixels in a display, wherein the color information may represent texture and shading (e.g., color, shadowing, etc.). Graphics pipeline 400 may be implementable within the client device 110, game server 160, game title processing engine 111, and/or GPU resources 365 of FIGS. 1 and 3. That is, various architectures may include multiple GPUs collaborating to render a single image by performing multi-GPU rendering of geometry for an application through region testing while rendering, such as implementing multi-GPU rendering of geometry between one or more cloud gaming servers of a cloud gaming system, or implementing multi-GPU rendering of geometry within a stand-alone system, such as a personal computer or gaming console that includes a high-end graphics card having multiple GPUs, etc.

As shown, the graphics pipeline receives input geometries 405. For example, the geometry processing stage 410 receives the input geometries 405. For example, the input geometries 405 may include vertices within a 3D gaming world, and information corresponding to each of the vertices. A given object within the gaming world can be represented using polygons (e.g., triangles) defined by vertices, wherein the surface of a corresponding polygon is then processed through the graphics pipeline 400 to achieve a final effect (e.g., color, texture, etc.). Vertex attributes may include normal (e.g., which direction is perpendicular to the geometry at that location), color (e.g., RGB—red, green, and blue triple, etc.), and texture coordinate/mapping information.

The geometry processing stage 410 is responsible for (and capable of) both vertex processing (e.g. via a vertex shader) and primitive processing. In particular, the geometry processing stage 410 may output sets of vertices that define primitives and deliver them to the next stage of the graphics pipeline 400, as well as positions (to be precise, homogeneous coordinates) and various other parameters for those vertices. The positions are placed in the position cache 450 for access by later shader stages. The other parameters are placed in the parameter cache 460, again for access by later shader stages.

Various operations may be performed by the geometry processing stage 410, such as performing lighting and shadowing calculations for the primitives and/or polygons. In one embodiment, as the geometry stage is capable of processing of primitives, it can perform backface culling, and/or clipping (e.g. testing against the view frustum), thereby reducing the load on downstream stages (e.g., rasterization stage 420, etc.). In another embodiment, the geometry stage may generate primitives (e.g. with functionality equivalent to a traditional geometry shader).

The primitives output by the geometry processing stage 410 are fed into the rasterization stage 420 that converts the primitives into a raster image composed of pixels. In particular, the rasterization stage 420 is configured to project objects in the scene to a two-dimensional (2D) image plane defined by the viewing location in the 3D gaming world (e.g., camera location, user eye location, etc.). At a simplistic level, the rasterization stage 420 looks at each primitive and determines which pixels are affected by the corresponding primitive. In particular, the rasterizer 420 partitions the primitives into pixel sized fragments, wherein each fragment corresponds to a pixel in the display. It is important to note that one or more fragments may contribute to the color of a corresponding pixel when displaying an image.

As previously described, additional operations may also be performed by the rasterization stage 420 such as clipping (identify and disregard fragments that are outside the viewing frustum) and culling (disregard fragments that are occluded by closer objects) to the viewing location. With reference to clipping, the geometry processing stage 410 and/or rasterization stage 420 may be configured to identify and disregard primitives that are outside the viewing frustum as defined by the viewing location in the gaming world.

The pixel processing stage 430 uses the parameters created by the geometry processing stage, as well as other data, to generate values such as the resulting color of the pixel. In particular, the pixel processing stage 430 at its core performs shading operations on the fragments to determine how the color and brightness of a primitive varies with available lighting. For example, pixel processing stage 430 may determine depth, color, normal and texture coordinates (e.g., texture details) for each fragment, and may further determine appropriate levels of light, darkness, and color for the fragments. In particular, pixel processing stage 430 calculates the traits of each fragment, including color and other attributes (e.g., z-depth for distance from the viewing location, and alpha values for transparency). In addition, the pixel processing stage 430 applies lighting effects to the fragments based on the available lighting affecting the corresponding fragments. Further, the pixel processing stage 430 may apply shadowing effects for each fragment.

The output of the pixel processing stage 430 includes processed fragments (e.g., texture and shading information) and is delivered to the output merger stage 440 in the next stage of the graphics pipeline 400. The output merger stage 440 generates a final color for the pixel, using the output of the pixel processing stage 430, as well as other data, such as a value already in memory. For example, the output merger stage 440 may perform optional blending of values between fragments and/or pixels determined from the pixel processing stage 430, and values already written to an MRT for that pixel.

Color values for each pixel in the display may be stored in a frame buffer (not shown). These values are scanned to the corresponding pixels when displaying a corresponding image of the scene. In particular, the display reads color values from the frame buffer for each pixel, row-by-row, from left-to-right or right-to-left, top-to-bottom or bottom-to-top, or any other pattern, and illuminates pixels using those pixel values when displaying the image.

Embodiments of the present disclosure use multiple GPUs in collaboration to generate and/or render a single image frame. The difficulty in using multiple GPUs is in distributing an equal amount of work to each GPU. Embodiments of the present disclosure are capable of providing an equal amount of work to each GPU (i.e. approximately distribution of work), support an increase in pixel count (i.e. resolution) and complexity, and/or an increase in geometric complexity, and/or an increase in the amount of processing per vertex and/or primitive, through analysis of the spatial distribution of the geometry to be rendered and dynamically (i.e. frame to frame) adjust GPU responsibility for screen regions to optimize for both geometry work and pixel. As such, dynamic distribution of GPU responsibility is performed by screen regions, as further described below in relation to FIGS. 5A-5B and 6A-6B.

Figure 5A:
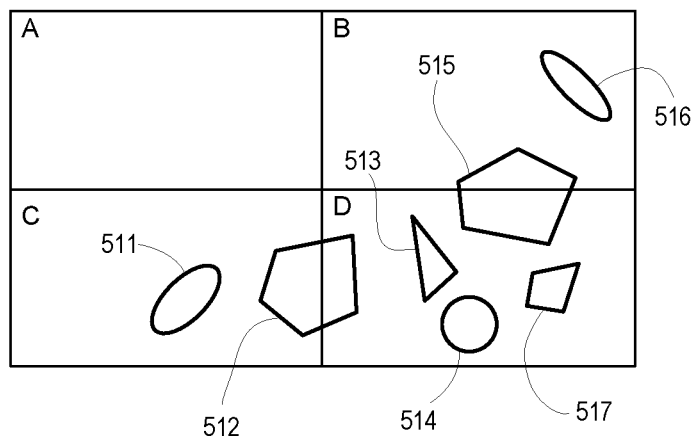
FIG. 5A is a diagram of a screen that is subdivided into quadrants when performing multi-GPU rendering, in accordance with one embodiment of the present disclosure.
Figure 5B:
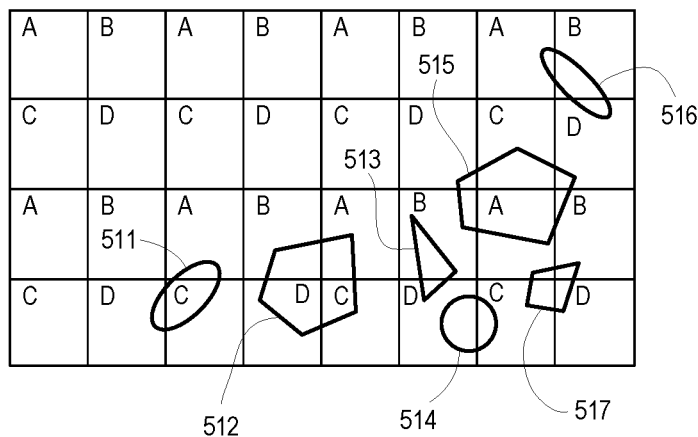
FIG. 5B is a diagram of a screen that is subdivided into a plurality of interleaved regions when performing multi-GPU rendering, in accordance with one embodiment of the present disclosure.
Figure 8:
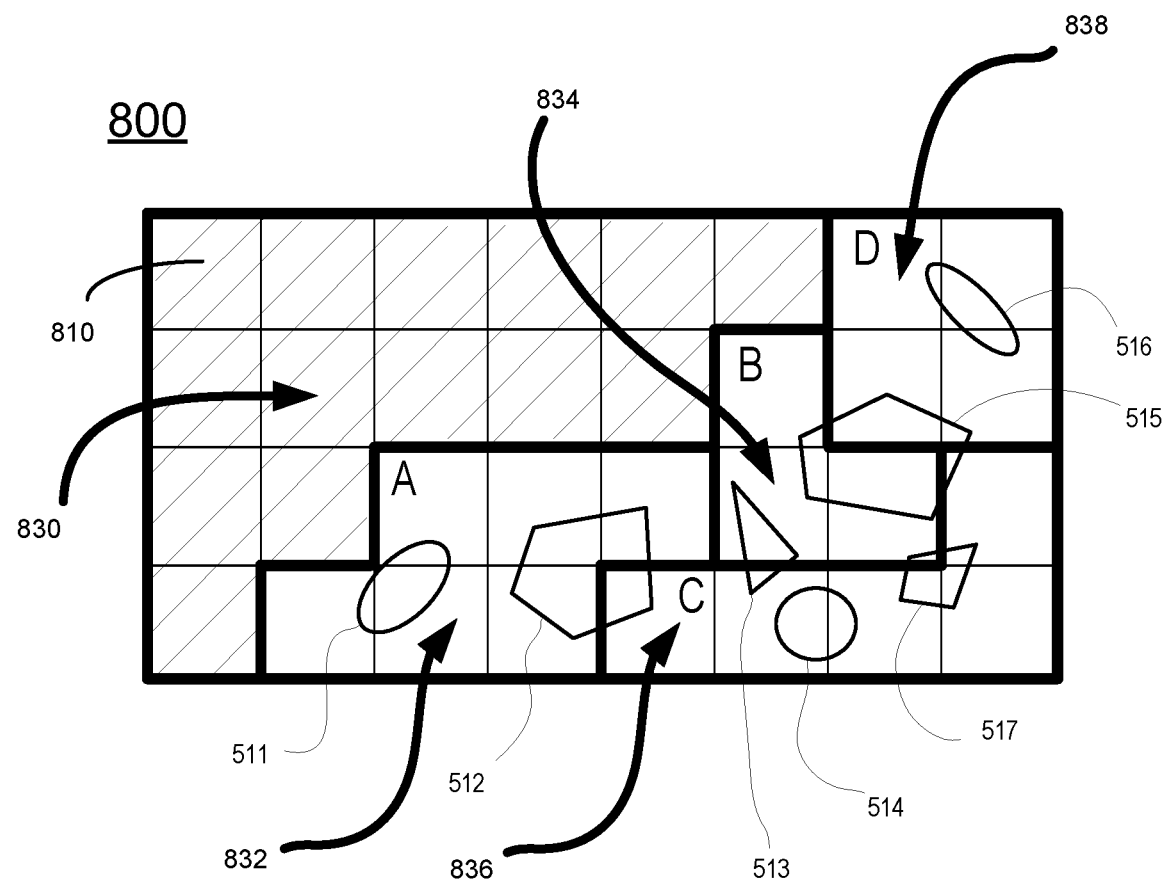
FIG. 8 is a diagram of a screen illustrating the dynamic assignment of screen regions to GPUs for geometry rendering based on an analysis of geometry of a current image frame performed while rendering the current image frame, in accordance with one embodiment of the present disclosure.

FIGS. 5A-5B show renderings, purely for purposes of illustration, of screens that are subdivided into regions, wherein each region is assigned to a GPU in a fixed fashion. That is to say, the assignment of regions to GPUs does not change from image frame to image frame. In FIG. 5A, the screen is subdivided into four quadrants, each of which is assigned to a different GPU. In FIG. 5B, the screen is subdivided into a larger number of interleaved regions, each of which is assigned to a GPU. The discussion of FIGS. 5A-5B below is intended to illustrate the inefficiencies that arise when performing multi-GPU rendering to a plurality of screen regions to which a plurality of GPUs are assigned; FIG. 8 shows more efficient rendering, according to embodiments of the invention.

In particular, FIG. 5A is a diagram of a screen 510A that is subdivided into quadrants (e.g. four regions) when performing multi-GPU rendering. As shown, screen 510A is subdivided into four quadrants (e.g. A, B, C, and D). Each quadrant is assigned to one of the four GPUs [GPU-A, GPU-B, GPU-C, and GPU-D], in a one-to-one relationship. That is, GPU responsibility is distributed by fixed region assignment, wherein each GPU has a fixed assignment to one or more screen regions. For example, GPU-A is assigned to quadrant A, GPU-B is assigned to quadrant B, GPU-C is assigned to quadrant C, and GPU-D is assigned to quadrant D.

The geometry can be culled. For example, CPU 163 can check a bounding box against each quadrant's frustum, and request each GPU to render only the objects that overlap its corresponding frustum. The result is that each GPU is responsible for rendering only a portion of the geometry. For purposes of illustration, screen 510 shows pieces of geometry, wherein each piece is a corresponding object, wherein screen 510 shows objects 511-517 (e.g. pieces of geometry). It is understood that pieces of geometry may correspond to whole objects or portions of objects (e.g., primitives, etc.). GPU-A will render no objects, as no objects overlap Quadrant A. GPU-B will render objects 515 and 516 (as a portion of object 515 is present in Quadrant B, the CPU's culling test will correctly conclude that GPU-B must render it). GPU-C will render objects 511 and 512. GPU-D will render objects 512, 513, 514, 515 and 517.

In FIG. 5A, when the screen 510A is divided into quadrants A-D, the amount of work that each GPU must perform may be very different, as a disproportionate amount of geometry may be in one quadrant in some situations. For example, quadrant A does not have any pieces of geometry, whereas quadrant D has five pieces of geometry, or at least portions of at least five pieces of geometry. As such, GPU-A assigned to quadrant A would be idle, while GPU-D assigned to quadrant D would be disproportionately busy when rendering objects in the corresponding image.

FIG. 5B illustrates another technique when subdividing a screen into regions, such that screen 510B is subdivided into a plurality of interleaved regions when performing multi-GPU rendering, in accordance with one embodiment of the present disclosure. In particular, rather than subdividing into quadrants, screen 510B is subdivided into a plurality of regions when performing multi-GPU rendering of a single image or each of one or more images in a sequence of images. For example, the screen 510B may be subdivided into regions corresponding to the GPUs. In that case, screen 510B is subdivided into a larger number of regions (e.g. greater than the four quadrants), while using the same amount of GPUs for rendering (e.g. four). The objects (511-517) shown in screen 510A are also shown in screen 510B in the same corresponding locations.

In particular, four GPUs (e.g. GPU-A, GPU-B, GPU-C, and GPU-D) are used to render an image for a corresponding application. Each of the GPUs is responsible for rendering geometry overlapping a corresponding region. That is, each GPU is assigned to a corresponding set of regions. For example, GPU-A is responsible for each of the regions labeled A in a corresponding set, GPU-B is responsible for each of regions labeled B in a corresponding set, GPU-C is responsible for each of regions labeled C in a corresponding set, and GPU-D is responsible for each of regions labeled D in a corresponding set.

Further, the regions are interleaved in a particular pattern. Because of the interleaving (and higher number) of regions, the amount of work that each GPU must perform may be much more balanced. For example, the pattern of interleaving of screen 510B includes alternating rows including regions A-B-A-B and so on, and regions C-D-C-D and so on. Other patterns of interleaving the regions is supported in embodiments of the present disclosure. For example, patterns may include repeated sequences of regions, evenly distributed regions, uneven distribution of regions, repeated rows of sequences of regions, random sequences of regions, random rows of sequences of regions, etc.

Choosing the number of regions is important. For example, if the distribution of regions is too fine (e.g., the number of regions is too great to be optimal), each GPU must still process most or all of the geometry. For example, it may be difficult to check object bounding boxes against all of the regions that a GPU is responsible for. Also, even if bounding boxes can be checked in a timely manner, due to small region size, the result will be that each GPU likely has to process most of the geometry because every object in an image overlaps at least one region of each of the GPUs (e.g. a GPU processes an entire object even though only a portion of the object overlaps at least one region in a set of regions assigned to that GPU).

As a result, choosing the number of regions is important. Choosing too few or too many regions may lead to inefficiencies when performing GPU processing (e.g. each GPU processing most or all of the geometry) or imbalances (e.g. one GPU processing many more objects than another). In those cases, even though there are multiple GPUs for rendering an image, due to these inefficiencies there is not the ability to support a corresponding increase in both screen pixel count and density of geometry (i.e. four GPUs can't write four times the pixels and process four times the vertices or primitives). Therefore, in embodiments of the present disclosure, information may be generated (via "geometry analysis") to indicate which object or objects are present in each of the screen regions. Geometry analysis may be performed while rendering or prior to rendering, and the resulting information can then be used to dynamically assign screen region to GPUs for further rendering of a corresponding image frame, as will be further described below. That is, screen regions are not fixed to corresponding GPUs, but may be dynamically assigned to GPUs for rendering a corresponding image frame.

Figure 6A:
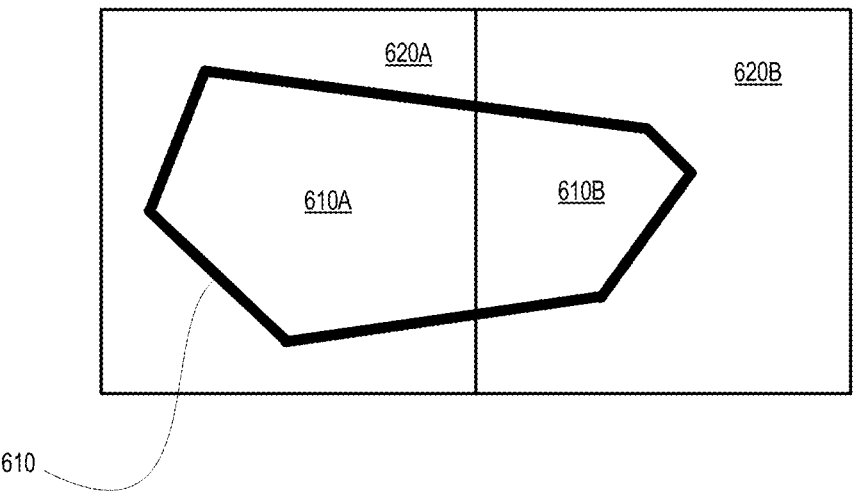
FIG. 6A illustrates object testing against screen regions when multiple GPUs collaborate to render a single image, in accordance with one embodiment of the present disclosure.
Figure 6B:
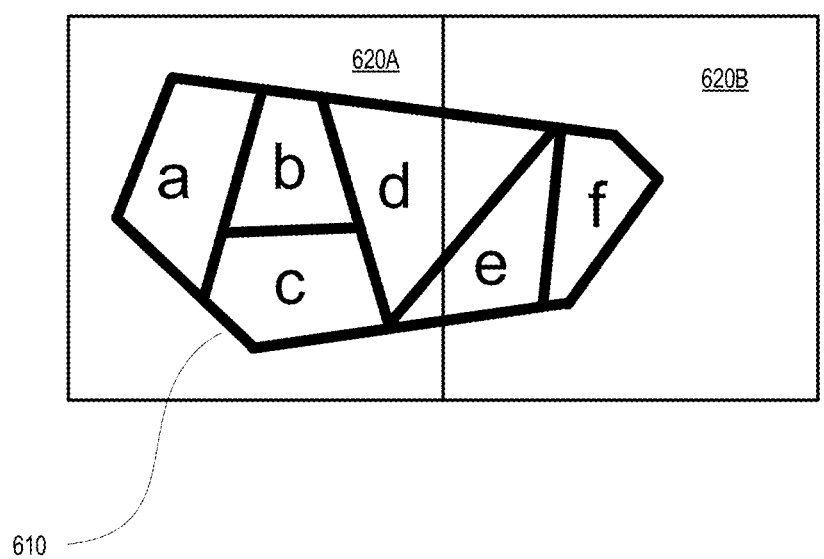
FIG. 6B illustrates testing of portions of an object against screen regions when multiple GPUs collaborate to render a single image, in accordance with one embodiment of the present disclosure.

FIGS. 6A-6B show the advantage of splitting an object within an image frame into smaller portions for purposes of performing geometry analysis in order to dynamically assign screen regions to GPUs for geometry rendering of whole objects and/or portions of objects of the image frame in various embodiments of the present disclosure. In particular, multi-GPU rendering of objects is performed for a single image frame by performing geometry analysis on objects in the screen. Information is generated for "pieces of geometry," wherein the pieces of geometry can be an entire object or portions of objects. For example, a piece of geometry can be an object 610, or portions of object 610. Specifically, GPUs are assigned to pieces of geometry (e.g., whole objects and/or portions of objects) for purposes of determining relationships between the geometry and each of a plurality of screen regions. That is, the GPUs in collaboration determine information that provides relationships between each of the pieces of geometry and each of the screen regions. Analysis is performed on the information to dynamically assign screen regions to the GPUs for subsequent rendering of a corresponding image frame. During the geometry analysis and subsequent rendering, e.g. rendering of geometry, if an object is associated with a single GPU for geometry rendering (e.g. dynamically assign all screen regions that include the object to the single GPU), then the other GPUs can skip that object entirely when rendering the image frame, which results in efficient processing of geometry, in accordance with one embodiment of the present disclosure. Furthermore, splitting an object into smaller portions can allow for still higher efficiencies when performing geometry analysis and/or rendering of the geometry in a corresponding image frame.

FIG. 6A illustrates geometry analysis of whole objects (i.e. the amount of geometry used by or generated by a corresponding draw call) to determine relationships of objects to screen regions when multiple GPUs collaborate to render a corresponding image frame, in accordance with one embodiment of the present disclosure. If an object is rendered whole (i.e. the geometry used by or generated by a draw call is not split into portions), then each GPU responsible for rendering screen regions overlapping with the object must render the whole object. In particular, during geometry analysis, object 610 may be determined to overlap region 620A and object 610 may also be determined to overlap region 620B. That is, portion 610A of object 610 overlaps region 620A, and portion 610B of object 610 overlaps region 620B. Subsequently, GPU-A is assigned responsibility for rendering objects in screen region 620A, and GPU-B is assigned responsibility for rendering objects in screen region 620B. Because objects are rendered wholly, GPU-A is tasked to fully render object 610, i.e. process all primitives within the object, including primitives across both regions 620A and 620B. In this particular example, GPU-B is also tasked to render object 610 in whole. That is, there may be duplication of work by GPU-A and GPU-B when performing rendering of the geometry of the object in the corresponding image frame. Also, the geometry analysis itself may be difficult to balance, if there are a small number of objects (i.e. draw calls) to distribute between the GPUs.

FIG. 6B illustrates geometry analysis of portions of an object to determine relationships of portions of objects to screen regions when multiple GPUs collaborate to render a corresponding image frame, in accordance with one embodiment of the present disclosure. As shown, the geometry used by or generated by a draw call is subdivided to create these portions of objects. For example, object 610 may be split into pieces, such that the geometry used by or generated by a draw call is subdivided into smaller pieces of geometry. In that case, information is generated for those smaller pieces of geometry during geometry analysis to determine relationships (e.g. overlap) between the smaller pieces of geometry and each of the screen regions. Geometry analysis is performed using the information to dynamically assign rendering responsibilities by screen regions between the GPUs for rendering the smaller pieces of geometry of a corresponding image frame. Each GPU only renders the smaller pieces of geometry that overlap screen regions to which it is responsible for, when performing rendering for a corresponding image frame. As such, each GPU is assigned to a set of screen regions for rendering pieces of geometry of a corresponding image frame. That is, there is a unique assignment of GPU responsibilities for each image frame. In that manner, there is higher efficiency when rendering a corresponding image frame because there may be less duplication of effort between GPUs when performing geometry analysis and/or rendering of the geometry of the object in the corresponding image frame.

In one embodiment, though the draw calls in the command buffer remain the same, while rendering the GPU splits the geometry into pieces. The pieces of geometry may be roughly the size for which the position cache and/or parameter cache are allocated. Each GPU either renders or skips these pieces, such that a GPU only renders pieces that overlap screen regions to which it is assigned.

For example, object 610 is split into portions, such that the pieces of geometry used for region testing corresponds to these smaller portions of object 610. As shown, object 610 is split into pieces of geometry "a", "b", "c", "d", "e", and "f". After geometry analysis, GPU-A may be dynamically assigned to screen region 620A in order to render pieces of geometry "a", "b", "c", "d", and "e" when rendering a corresponding image frame. That is, GPU-A can skip rendering piece of geometry "f". Also, after geometry analysis, GPU-B may be assigned to screen region 620B in order to render pieces of geometry "d," "e", and "f", when rendering the corresponding image frame. That is, GPU-B can skip rendering pieces of geometry "a", "b", and "c". As shown, there is less duplication of effort between GPU-A and GPU-B, as instead of rendering object 610 wholly, only pieces of geometry "d" and "e" are rendered by each of GPU-A and GPU-B.

Multi-GPU Rendering of Geometry by Performing Geometry Analysis while Rendering

Figure 7:
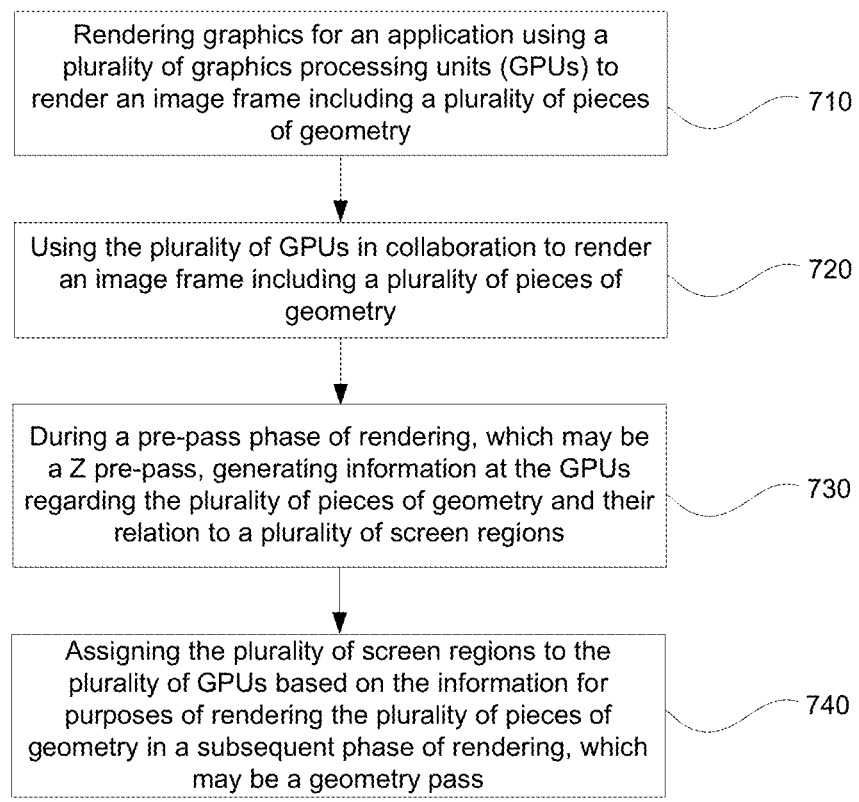
FIG. 7 is a flow diagram illustrating a method for graphics processing including multi-GPU rendering of geometry for an application by performing geometry analysis while rendering, in accordance with one embodiment of the present disclosure.

With the detailed description of the cloud game network 190 (e.g. in the game server 160) and the GPU resources 365 of FIGS. 1-3, flow diagram 700 of FIG. 7 illustrates a method for graphics processing when implementing multi-GPU rendering of geometry for an image frame generated by an application by performing geometry analysis while rendering, in accordance with one embodiment of the present disclosure. In particular, a number of GPUs collaborate to generate an image frame. Responsibility for certain phases of rendering is divided between a plurality of the GPUs based on screen region for each image frame. While rendering geometry, GPUs generate information regarding the geometry and its relation to screen regions. This information is used to assign GPUs to screen regions, allowing for more efficient rendering. In that manner, multiple GPU resources are used to efficiently perform rendering of objects of an image frame when executing an application. As previously described, various architectures may include multiple GPUs collaborating to render a single image by performing multi-GPU rendering of geometry for an application through region testing while rendering, such as within one or more cloud gaming servers of a cloud gaming system, or within a stand-alone system, such as a personal computer or gaming console that includes a high-end graphics card having multiple GPUs, etc.

At 710, the method includes rendering graphics using a plurality of GPUs, wherein in certain phases responsibility for rendering is dynamically divided between the plurality of the GPUs based on screen regions. In particular, multi-GPU processing is performed when rendering a single image frame, and/or each of one or more image frames of a sequence of image frames for a real-time application, where each image frame includes a plurality of pieces of geometry. In certain phases, GPU rendering responsibility is dynamically assigned between a plurality of screen regions for each image frame, such that each GPU renders pieces of geometry in its assigned screen regions. That is, each GPU has a corresponding division of the responsibility (e.g. corresponding screen regions).

At 720, the method includes using the plurality of GPUs in collaboration to render an image frame including a corresponding plurality of pieces of geometry. In one embodiment, a pre-pass phase of rendering is performed when rendering. In one embodiment, this pre-pass phase of rendering is a Z pre-pass, wherein the plurality of pieces of geometry are rendered.

To perform the pre-pass phase of rendering, at 720 the method includes dividing responsibility for processing the plurality of pieces of geometry of the image frame during the Z pre-pass phase of rendering between the plurality of GPUs. That is, each of the plurality of pieces of geometry is assigned to a corresponding GPU for performing the Z pre-pass, and/or each of the GPUs is assigned a set of screen regions for which it is responsible. As such, the plurality of pieces of geometry are rendered in the Z pre-pass phase at the plurality of GPUs to generate the one or more Z-buffers. In particular, each GPU renders corresponding pieces of geometry in the Z pre-pass phase to generate a corresponding Z-buffer. For example, for a corresponding piece of geometry the Z-buffer may include a corresponding z-value (e.g. depth value) measuring the distance from a pixel on a plane of projection to the piece of geometry. Hidden geometry or objects may be removed from the Z-buffer, as is well known in the art.

Each GPU may have a dedicated Z-buffer, in one embodiment. For example, a first GPU renders a first piece of geometry in the Z pre-pass phase to generate a first Z-buffer. Other GPUs render corresponding pieces of geometry in the Z pre-pass phase to generate corresponding Z-buffers. In one embodiment, each GPU sends its data in its corresponding Z-buffer to each of the plurality of GPUs so that corresponding Z buffers are updated and are approximately similar for use when rendering geometry of the image frame. That is, each GPU is configured to merge received data from all the Z-buffers, such that each corresponding Z-buffer for the GPUs is similarly updated.

At 730, the method includes generating information regarding the plurality of pieces of geometry of the image frame and their relations to a plurality of screen regions. In one implementation, the information is generated during the pre-pass phase of rendering. For example, information is generated at a first GPU while rendering a piece of geometry, wherein the information may indicate which screen regions that piece of geometry overlaps. As previously described, the piece of geometry may be a whole object (i.e. the geometry used by or generated by an individual draw call) or portions of an object (e.g. individual primitives, groups of primitives, etc.). Further, the information may include presence of a piece of geometry in corresponding screen regions. The information may include a conservative approximation as to the presence of the piece of geometry in corresponding screen regions. The information may include the pixel area or approximate pixel area (e.g. coverage) that the piece of geometry covers in a screen region. The information may include the number of pixels written to a screen region. The information may include the number of pixels written to the Z buffer per piece of geometry per screen region during the Z pre-pass phase of rendering.

At 740, the method includes using this information in subsequent assignment of screen regions to the plurality of GPUs. In particular, each GPU is assigned to corresponding screen regions based on the information for purposes of rendering the image frame during a subsequent phase of rendering, which may be a geometry pass. In that manner, assignment of screen regions to GPUs may vary from image frame to image frame, which is to say that it may be dynamic.

FIG. 8 is a diagram of a screen 800 illustrating the dynamic assignment of screen regions to GPUs for geometry rendering (i.e. the rendering of pieces of geometry to MRTs) based on an analysis of geometry of a current image frame performed while rendering the current image frame, in accordance with one embodiment of the present disclosure. As shown screen 800 may be subdivided into regions, each approximately equal in size for purposes of illustration. In other embodiments, each of the regions may vary in size and shape. For example, region 810 is representative of an equal subdivision of screen 800.

The objects and positions of objects shown in screen 800 are identical to the objects and their positions shown in screen 510A of FIG. 5A and screen 510B of FIG. 5B. For instance, objects 511-517 are shown in screen 800. FIG. 5A shows the partitioning of screen 510A into quadrants which are fixedly assigned to GPUs for geometry rendering. FIG. 5B shows the portioning of screen 510B into regions which are assigned in a fixed fashion to GPUs for geometry rendering. FIG. 8 shows the dynamic assignment of screen regions to GPUs for a current image frame including objects 511-517. The assignment is performed per image frame. That is, in the next image frame, objects 511-517 may be in different positions, and as such, the assignment of screen regions for the next image frame may be different than the assignment for the current image frame. For example, GPU-A is assigned to the set of screen regions 832, and renders objects 511 and 512. Also, GPU-B is assigned to the set of screen regions 834, and renders objects 513, 515, and 517. GPU-C is assigned to the set of screen regions 836, and renders objects 512, 513, 514, and 517. And GPU-D is assigned to the set of screen regions 838, and renders objects 515 and 516. When objects are further partitioned into portions, there may be less duplication of rendering as the smaller portions may have less overlap between GPU regions. That is, though draw calls in the corresponding command buffer remain the same, while rendering a GPU splits geometry into pieces (e.g., portions of objects), potentially such as pieces roughly the size at which the position and/or parameter caches are allocated, and either renders or skips those pieces depending on whether they overlap screen regions assigned to that GPU for geometry rendering.

In one embodiment, the assignment of screen regions to GPUs may be handled such that roughly equal amounts of pixel work is performed by each GPU when rendering the geometry. This may not necessarily equate to equal amounts of screen areas covered by corresponding objects because the pixel shaders associated with objects may differ in complexity. For example, GPU D is responsible for rendering four regions, wherein GPU-A is responsible for rendering 6 regions, though their corresponding pixel and/or rendering work may be approximately equal. That is, objects may have different rendering costs, such that the cost per pixel or primitive or vertex may be higher or lower for different objects. This cost per pixel or primitive or vertex, etc. may be made available to each GPU and used for the generation of the information, or may be included as information. Alternatively, the cost may be used when assigning screen regions.

In one embodiment, the cross-hatched region 830 contains no geometry and might be assigned to any one of the GPUs. In another embodiment, the cross-hatched region 830 is not assigned to any of the GPUs. In either case, no geometry rendering is performed for region 830.

In another embodiment, all regions associated with an object are assigned to a single GPU. In that manner, all the other GPUs can then skip the object entirely when performing geometry rendering.

Figure 9A:
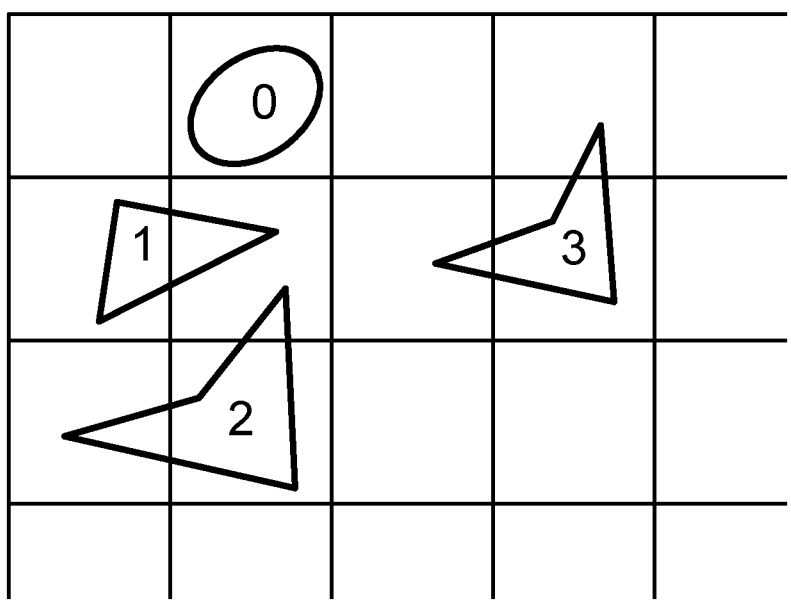

FIGS. 9A-9C are diagrams providing a more detailed description for the rendering of an image frame showing four objects, wherein the rendering of the image frame includes a Z pre-pass phase and a geometry phase of rendering. As previously described, the Z pre-pass phase is performed for generating information used for the dynamic assignment of screen regions to GPUs for geometry rendering of the image frame, in accordance with embodiments of the present disclosure. For purposes of illustration, FIGS. 9A-9C illustrate the use of multiple GPUs to render each of a sequence of image frames. The selection of four GPUs for the example shown in FIGS. 9A-9C is made purely for illustrating multi-GPU rendering, and it is understood that any number of GPUs may be used for multi-GPU rendering, in various embodiments.

In particular, FIG. 9A illustrates a screen 900A showing four objects included within an image frame. For example, the image frame includes object 0, object 1, object 2, and object 3. As shown, screen 900A is split into regions. For example, screen 900A may be split into more than four regions, each of which is assigned to a corresponding GPU for rendering a current image frame.

In one embodiment, a single command buffer is used by the multiple GPUs to render the corresponding image frame. The common rendering command buffer may include draw calls and state settings for each object to perform the Z pre-pass phase of rendering. A sync (e.g., synchronization) operation may be included within the command buffer so that all the GPUs begin the geometry pass phase of rendering at the same time. The command buffer may include draw calls and state set for each object to perform the geometry pass phase of rendering.

In one embodiment, the common rendering command buffer supports the ability for a command to be executed by one GPU but not by another. That is, the format of the common rendering command buffer allows a command to be executed by one or a subset of the plurality of GPUs. For instance, flags on a draw command or predication in the rendering command buffer allow a single GPU to execute one or more commands in the corresponding command buffer without interference from other GPUs, as previously described.

FIG. 9B illustrates a Z pre-pass phase of rendering performed to generate one or more Z-buffers and information relating pieces of geometry of a particular image frame and each of the screen regions and/or sub regions of a drawn screen, in accordance with one embodiment of the present disclosure. In the Z pre-pass phase of rendering of FIG. 9B, one strategy is shown by which multiple GPUs can collaborate to generate one or more Z-buffers for a frame of rendering. Other strategies may be implemented to generate the one or more Z-buffers.

As shown, each GPU in the multi-GPU architecture is allocated a portion of the geometry. For purposes of illustration, GPU-A is assigned to object 0, GPU-B is assigned to object 1, GPU-C is assigned to object 2, and GPU-D is assigned to object 3. Each GPU renders corresponding objects in the Z pre-pass phase, and renders the corresponding objects to its own copy of the Z buffer. For example, in the Z pre-pass phase GPU-A renders object 0 to its Z-buffer. Screen 921 shows pixel coverage of object 0 as determined by GPU-A and stored in its corresponding Z-buffer. Also, GPU-B renders object 1 to its Z-buffer, such that screen 922 shows pixel coverage of object 1 as determined by GPU-B and stored in its corresponding Z-buffer. In addition, GPU-C renders object 2 to its Z-buffer, such that screen 923 shows pixel coverage of object 2 as determined by GPU-C and stored in its corresponding Z-buffer. Further, GPU-D renders object 3 to its Z-buffer, such that screen 924 shows pixel coverage of object 3 as determined by GPU-D and stored in its corresponding Z-buffer.

Thereafter, the four Z buffer copies corresponding to the GPUs are merged. That is, each GPU has a corresponding copy of the Z-buffer in its own RAM (random access memory). In one embodiment, the strategy of building one or more Z-buffers includes having each GPU send its completed Z-buffer to the other GPUs. In that manner, each of the Z-buffers should be similar in size and format. In particular, data in each of the Z-buffers are sent to all of the GPUs for purposes of merging and updating each of the Z-buffers, which is shown by screen 925 showing pixel coverage of each of the four objects 1-4 and stored in each of the updated Z-buffers of the GPUs. The objects are blank in FIG. 9B to represent that only Z is being written and that other values (e.g. color) have not been calculated for each of the pixels of the screen.

In another embodiment, the merge time is reduced. Instead of waiting for each Z-buffer to be fully completed by a corresponding GPU before the data is sent to other GPUs, as each GPU writes corresponding pieces of geometry to its Z buffer, the corresponding GPU sends the Z buffer data for updated screen regions to other GPUs. That is, as a first GPU renders geometry to a corresponding Z-buffer or other render targets, the first GPU sends data from the Z-buffer or the other render target data including updated screen regions to the other GPUs. By not waiting for each Z-buffer for corresponding GPUs to be completely written before being sent, this removes a portion of the time required to merge the Z buffers, thereby reducing the merge time.

In another embodiment, another strategy for building a Z-buffer includes sharing a common Z-buffer or common render targets between the multiple GPUs. For example, hardware used for performing the Z-buffering may be configured so that there is a common Z-buffer or common render target that is shared, and updated by each of the GPUs. That is, each of the GPUs updates the common Z-buffer while rendering one or more corresponding pieces of geometry in the Z pre-pass phase of rendering. In the example of the four GPU architecture, a first GPU renders geometry to a corresponding Z-buffer or other render targets by updating the common Z-buffer or common render targets, each being shared by the plurality of GPUs. The use of a common Z-buffer or common render targets removes the need for a merge step. In one embodiment, screen regions are allocated to the GPUs, simplifying the need for arbitration when accessing the common Z-buffer.

As previously described, information is generated while rendering the Z-buffer. In one embodiment, the scan converter performing as part of the rasterization stage 420 of FIG. 4 generates the information. For example, the scan converter may calculate the area of overlap for a piece of geometry and each of the screen regions. In various embodiments, the overlap may be measured in pixels, such as between each primitive in a piece of geometry and each of the screen regions. Further, the scan converter may sum the areas of overlap to create the total area of overlap (e.g., by pixel) per piece of geometry, as measured for each region.

Prior to commencement of the geometry pass, the information may be used to assign screen regions to GPUs. That is, one or more of the plurality of GPUs may be assigned to screen regions. In one embodiment, the assignments are made such that rendering responsibilities (e.g. rendering geometry) for each GPU are approximately equal. In that manner, information generated in one phase of rendering (the Z pre-pass phase) is used in another phase of rendering, such as to assign screen regions to GPUs for the geometry pass phase of rendering.

As previously described, objects may have rendering costs that differs from other objects. That is, the cost per pixel, or primitive, or vertex for one object may be higher or lower than other objects. In some embodiments the cost per pixel/primitive/vertex is made available to the GPU and used in the generation of the information, and/or included within the information. In another embodiment, the cost per pixel/primitive/vertex is used when assigning screen regions to GPUs, such that the information generated takes into account the approximate rendering cost for a corresponding piece of geometry per pixel, or primitive, or vertex. That is, a plurality of costs is determined for rendering a plurality of pieces of geometry of an image frame during the geometry phase of rendering. The costs are considered when assigning the screen regions to the GPUs for geometry rendering. For example, the subsequent assignment of screen regions to the plurality of GPUs takes into account the approximate rendering cost for the piece of geometry per pixel, primitive or vertex, such that the GPUs may be assigned to screen regions in a manner that the cost of rendering is divided as desired (equally or non-equally) between the GPUs.

FIG. 9C illustrates a geometry pass phase of rendering performed to render pieces of geometry of a particular image frame, in accordance with one embodiment of the present disclosure. In the geometry pass phase, each GPU renders the objects for a particular image frame to the screen regions for which it is responsible (e.g., based on the previous assignments of GPUs to screen regions). In particular, each GPU will render all objects, except those for which it is known (based on the information) that there is no overlap between those objects and the screen regions assigned to the GPU for geometry rendering. As such, if there is no overlap for a piece of geometry to screen regions assigned to a particular GPU, that GPU can skip the render for that piece of geometry.

As shown, each GPU in the multi-GPU architecture is allocated or assigned to a portion of the screen. For purposes of illustration, GPU-A is assigned to the one region labeled 931A), and renders object 0 (as introduced in FIG. 9A) (now darkened to represent other values, e.g. color data, being written). Screen 931 shows render target data (e.g. pixels) of object 0 after geometry rendering. Also, GPU-B is assigned to the two regions labeled 932A, and renders object 1, and a portion of object 2 (respective portions of those objects darkened). Screen 932 shows render target data (e.g. pixels) of respective portions of objects 1 and 2 after geometry rendering. Further, GPU-C is assigned to the two regions labeled 933A, and renders portions of object 2 (respective portions darkened). Screen 933 shows render target data (e.g. pixels) of respective portions of object 2 after geometry rendering. Also, GPU-D is assigned to the three regions labeled 934A and renders object 3 (now darkened to represent other values, e.g. color data, being written). Screen 934 shows render target data (e.g. pixels) of object 3 after geometry rendering.

After the render of geometry, the render target data generated by each of the GPUs may need to be merged. For example, merging of the geometry data generated during the geometry pass phase of rendering for each GPU is performed, which is shown by screen 935 including render target data (e.g. pixels) of all four objects 0-3.

In one embodiment, assignment of screen regions to GPUs changes from frame-to-frame. That is, each GPU may be responsible for different screen regions when comparing assignments for two successive image frames. In another embodiment, assignment of screen regions to GPUs may also vary throughout the various phases used in rendering a single frame. That is, assignments of screen regions may dynamically change during a rendering phase, such as geometry analysis phase (e.g., Z pre-pass) or geometry pass phase.

For example, when an assignment is made for the geometry phase, the assignment may therefore differ from an existing assignment. That is, GPU-A may now be responsible for a screen region that formerly GPU-B was responsible for. This may necessitate a transfer of Z-buffer or other render target data from the memory of GPU-B to the memory of GPU A. As an example, the information may include the first object in the command buffer that will write to a screen region. That information can be used to schedule a DMA (direct memory access) transfer, such as to transfer Z-buffer data or other render target data for a screen region from one GPU to another GPU. Following the above example, data from memory of GPU-B (e.g., Z-buffer or render target data) may be transferred to the memory of GPU-A. In some cases, the later the first usage of the screen usage occurs when rendering the image frame, the more time there is for the DMA transfer.

In another embodiment, upon completion of all updates of the Z buffer or other render target data between the GPUs, the information may include the last object in the command buffer that will write to a screen region. That information may be used to schedule DMA transfer from the rendering GPU (performing during the Z pre-pass phase of rendering) to other GPUs. That is, the information is used to schedule transfer of the Z-buffer or other render target data for a screen region from one GPU to another GPU—e.g. a rendering GPU.

In still another embodiment, upon completion of all updates of the Z buffer or other render target data between the GPUs, the updated data may be broadcast to the GPUs. In that case, the updated data is available if any of the GPUs need that data. In another embodiment, the data is sent to a specific GPU, such as in anticipation of the receiving GPU being responsible for the screen region in a subsequent phase of rendering.

Figure 10:
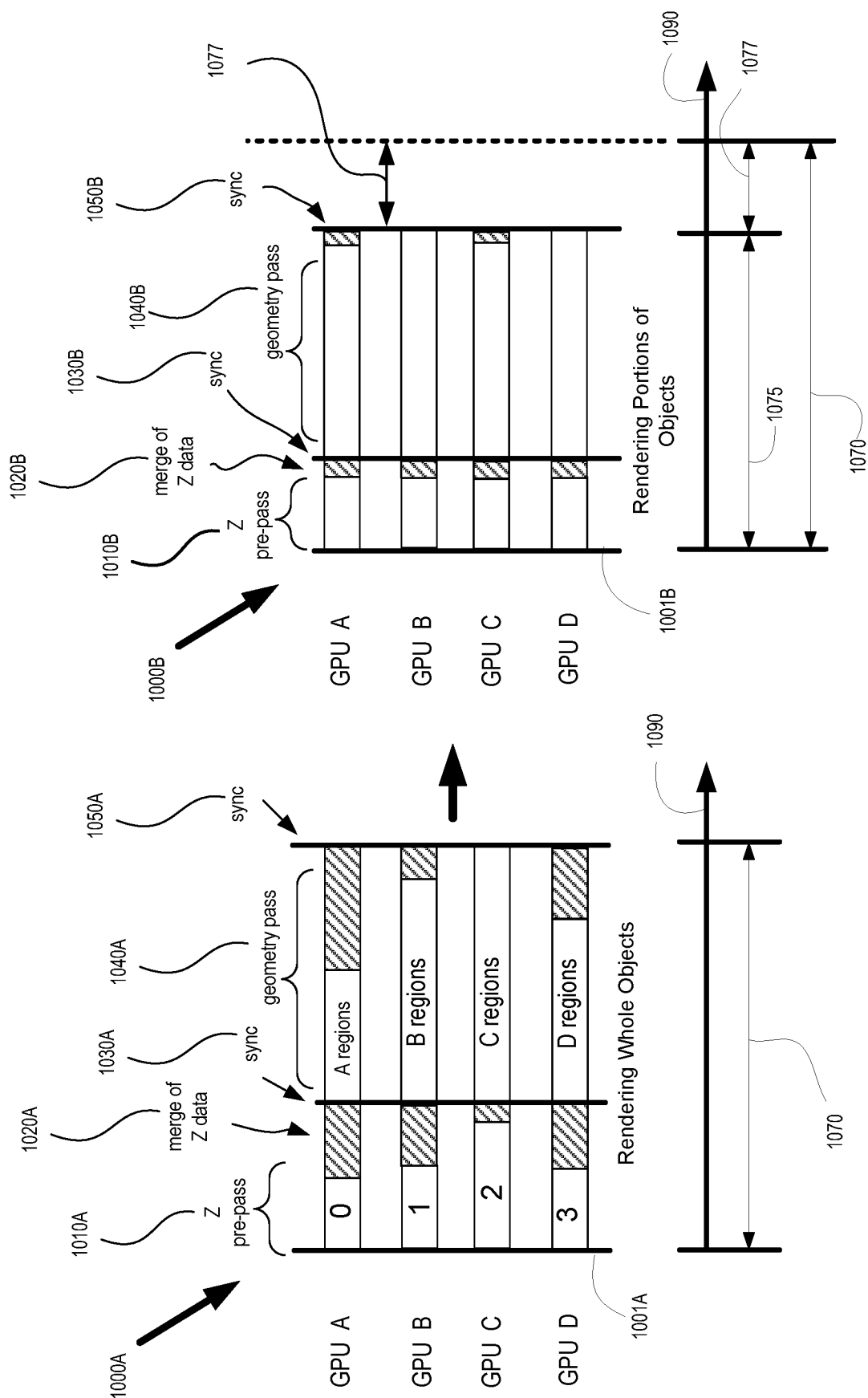
FIG. 10 illustrates rendering an image frame using the dynamic assignment of screen regions based on whole objects or portions of objects to GPUs for geometry rendering based on an analysis of geometry of a current image frame performed during a Z pre-pass phase of rendering while rendering the image frame, in accordance with one embodiment of the present disclosure.

FIG. 10 illustrates the rendering of an image frame using the dynamic assignment of screen regions based on whole objects or portions of objects to GPUs for geometry rendering, wherein the assignment is based on an analysis of geometry of a current image frame performed during a Z pre-pass phase of rendering performed while rendering the image frame, in accordance with one embodiment of the present disclosure. In particular, rendering timing diagram 1000A shows the rendering of the image frame based on whole objects (i.e. the geometry used or generated by an individual draw call). In contrast, rendering timing diagram 1000B shows the rendering of the image frame based on portions of the objects. The advantages shown when rendering the image frame based on portions of objects includes a more balancing of rendering performance between the GPUs, and therefore a shorter time for rendering the image frame.

In particular, rendering timing diagram 1000A illustrates the rendering of each of four objects 0-3 by the four GPUs (e.g. GPU-A, GPU-B, GPU-C, and GPU-D), wherein rendering responsibilities are distributed between the GPUs at an object granularity. The objects 0-3 were previously introduced in FIGS. 9A-9C. Various phases of rendering are shown in relation to a timeline 1090. Vertical line 1001A indicates the start of rendering of the Z pre-pass. Rendering timing diagram 1000A includes a Z pre-pass phase of rendering 1010A, and also illustrates phase 1020A showing the merging of Z-buffer data between the GPUs. GPU idle time is shown using hashed out areas, wherein the merging phase 1020A may occur during this idle time. A sync point 1030A is provided so that each of the GPUs begin respective geometry pass rendering phases at the same time. Also, rendering timing diagram 1000A includes a geometry pass phase 1040A of rendering for rendering geometry of the image frame, as previously described. A sync point 1050A is provided so that each of the GPUs begin rendering the next image frame at the same time. Sync point 1050A may also indicate the end of the rendering for the corresponding image frame. The total time for rendering the image frame when rendering whole objects is shown by time period 1070. Processing the information to determine screen region responsibilities for each GPU is not shown in the diagram, but may be presumed to conclude prior to the commencement of the geometry pass 1030A.

As shown, the hashed areas of rendering timing diagram 1000A during the geometry pass phase 1040A show GPU idle time. For example, GPU-A is idle for almost the same time that GPU-A spends on rendering. On the other hand, GPU-B spends very little time being idle, and GPU-C spends no time being idle.

In contrast, rendering timing diagram 1000B illustrates the rendering of each of four objects 0-3 by the four GPUs (e.g. GPU-A, GPU-B, GPU-C, and GPU-D), wherein rendering responsibilities are distributed between the GPUs at a granularity of portions of objects rather than whole objects, such as the pieces of geometry shown in FIG. 6B. For example, information (e.g. overlap with screen regions) is generated for pieces of geometry (e.g. portions of objects) rather than whole objects. In that manner, the geometry of an image frame used by or generated by a draw call (e.g., whole object) is subdivided into smaller pieces of geometry, and the information generated is for those pieces of geometry. In some cases, there is a limit as to how small the pieces of geometry may be subdivided.

Various phases of rendering are shown in relation to a timeline 1090. Vertical line 1001B indicates the start of rendering of the Z pre-pass. Rendering timing diagram 1000B includes a Z pre-pass phase of rendering 1010B, and also illustrates the hashed out time period 1020B during which merging of Z-buffer data between the GPUs is performed. The GPU idle time 1020B in rendering timing diagram 1000B is less than the idle time 1020A in rendering timing diagram 1000A. As shown, each of the GPUs spends approximately the same amount of time processing the Z pre-pass phase, with little or no idle time. A sync point 1030B is provided so that each of the GPUs begin respective geometry pass rendering phases at the same time. Also, rendering timing diagram 1000B includes a geometry pass phase 1040B of rendering for rendering geometry of the image frame, as previously described. A sync point 1050B is provided so that each of the GPUs begin rendering the next image frame at the same time. Sync point 1050B may also indicate the end of the rendering for the corresponding image frame. As shown, each of the GPUs spend approximately the same amount of time processing the geometry pass phase, with little or no idle time. That is, the Z pre-pass rendering and geometry rendering is each roughly balanced between the GPUs. Also, the total time for rendering the image frame when rendering by portions of whole objects is shown by time period 1075. Processing the information to determine screen region responsibilities for each GPU is not shown in the diagram, but may be presumed to conclude prior to the commencement of the geometry pass 1030B.

As shown, rendering timing diagram 1000B shows reduced rendering time when rendering responsibilities are distributed between the GPUs at a granularity of portions of objects rather than whole objects. For instance, a time savings 1077 is shown when rendering the image frame at a granularity of portions of objects.

In addition, the information allows relaxation of rendering phase requirements and/or dependencies, which results in a GPU proceeding to a subsequent phase of rendering while another GPU is still processing a current phase of rendering, in accordance with one embodiment of the present disclosure. For example, one requirement that the Z pre-pass phase 1020A or 1020B must complete for all GPUs before any GPUs begin the geometry phase 1040A or 1040B may be relaxed. As shown, rendering timing diagram 1000A includes a sync point 1020A of all GPUs prior to beginning the geometry phase 1040A. However, the information may indicate (for example) that GPU A can begin rendering its assigned region before the other GPUs have completed their corresponding Z pre-pass phase of rendering. This may lead to an overall reduction in rendering time for the image frame.

Figure 11:
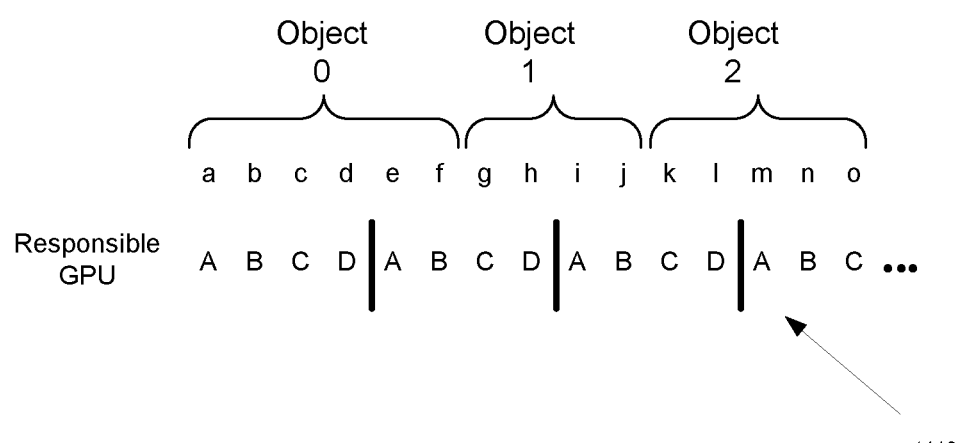
FIG. 11 is a diagram illustrating the interleaving of GPU assignments to pieces of geometry of an image frame for purposes of performing a Z pre-pass phase of rendering to generate information used for the dynamic assignment of screen regions to GPUs for geometry rendering of the image frame, in accordance with one embodiment of the present disclosure.

FIG. 11 is a diagram illustrating the interleaving of GPU assignments to pieces of geometry of an image frame for purposes of performing a Z pre-pass phase of rendering to generate information used for the dynamic assignment of screen regions to GPUs for geometry rendering of the image frame, in accordance with one embodiment of the present disclosure. That is, FIG. 11 shows the distribution of rendering responsibilities between multiple GPUs for the Z pre-pass. As previously described, each GPU is assigned to a corresponding portion of the geometry of an image frame, wherein that portion may be further partitioned into objects, portions of objects, geometry, pieces of geometry, etc.

As shown in FIG. 11, objects 0, 1 and 2 represent the geometry used by or generated by an individual draw call. In one embodiment, the GPU divides each object into smaller pieces of geometry, such as pieces roughly the size at which the position and/or parameter caches are allocated, as previously described. Purely for illustration, object 0 is split into pieces "a", "b", "c", "d", "e" and "f", such as object 610 in FIG. 6B. Also, object 1 is split into pieces "g", "h", and "i". Further, object 2 is split into pieces "j", "k", "l", "m", "n", and "o". The pieces may be ordered (e.g., a-o) for purposes of distributing responsibility for performing the Z pre-pass phase of rendering.

Distribution 1110 (e.g. the ABCDABCDABCD . . . row) shows an even distribution of the responsibility for performing geometry testing between a plurality of GPUs. In particular, rather than having one GPU take the first quarter of the geometry (e.g. in a block, such as GPU A takes the first four pieces of the approximately sixteen total pieces including "a", "b", "c" and "d" for geometry testing), and the second GPU take the second quarter, etc., assignment to GPUs is interleaved. That is, successive pieces of geometry are assigned to different GPUs for performing the Z pre-pass phase of rendering. For example, piece "a" is assigned to GPU-A, piece "b" is assigned to GPU-B, piece "c" is assigned to GPU-C, piece "d" is assigned to GPU-D, piece "e" is assigned to GPU-A, piece "f" is assigned to GPU-B, piece "g" is assigned to GPU-C, etc. As a result, there is no need to know the total number of pieces of geometry to process (as would be the case if GPU-A took the first quarter of the pieces of geometry, etc.), and processing of the Z pre-pass phase of rendering is roughly balanced between the GPUs (e.g., GPU-A, GPU-B, GPU-C, and GPU-D).

In other embodiments, information generated while rendering one frame (e.g. previous image frame) can be used to assign GPUs to screen regions in a subsequent frame (e.g. current image frame). For example, hardware could be configured to generate information during the geometry pass phase of rendering of the previous image frame, such as GPU usage during the geometry pass phase of rendering for the previous image frame. Specifically, the information may include actual number of pixels that is shaded per piece of geometry per screen region. This information may be used in the subsequent frame (e.g. rendering the current image frame) when allocating GPUs to screen regions for the geometry pass of rendering. That is, the assignment of screen regions to GPUs for performing the geometry pass phase of rendering for the current image frame considers both the information generated from the previous image frame, and the information generated during the Z pre-pass phase for the current image frame (if any), as previously described. As such, the screen regions are assigned to the GPUs based on the information from the previous image frame (e.g., GPU usage) and the information generated during the Z pre-pass phase of rendering of the current image frame (if any).

This information from the prior frame may add more accuracy than just using the area of overlap (e.g. when generating information for the current image frame) previously discussed, or just using the number of pixels written to the Z buffer per piece of geometry per screen region during the Z pre-pass. For example the number of pixels written to the Z buffer for an object may not correspond to the number of pixels that need to be shaded in the geometry pass due to occlusion of the object by other objects. The use of both the information from the previous image frame (e.g., GPU usage) and the information generated during the Z pre-pass phase of rendering of the current image frame may result in more efficient rendering during the geometry pass phase of rendering for the current image frame.

The information may also include a vertex count for each screen region, which gives the number of vertices used by a corresponding portion of geometry (e.g. piece of geometry) that overlaps a corresponding screen region. As such, when later rendering the corresponding piece of geometry, the rendering GPU may use the vertex count to allocate space in the position cache and parameter cache. For example, vertices that are not needed do not have any allocated space, which may increase the efficiency of rendering, in one embodiment.

In still other embodiments, there may be processing overhead (either software or hardware) associated with generating the information during Z pre-pass phase of rendering. In that case, it may be beneficial to skip generating information for certain pieces of geometry. That is, information may be generated for certain objects but not for others. For example, information may not be generated for a piece of geometry (e.g., an object or portions of the object) that has large primitives and will probably overlap a great number of screen regions. An object having large primitives may be a skybox or a large piece of terrain include triangles that are large, for example. In that case, it is likely that each GPU used for multi-GPU rendering of an image frame will need to render those pieces of geometry, and any information indicating such is unnecessary. As such, the information may be generated or not generated depending on the properties of the corresponding piece of geometry.

Figure 12A:
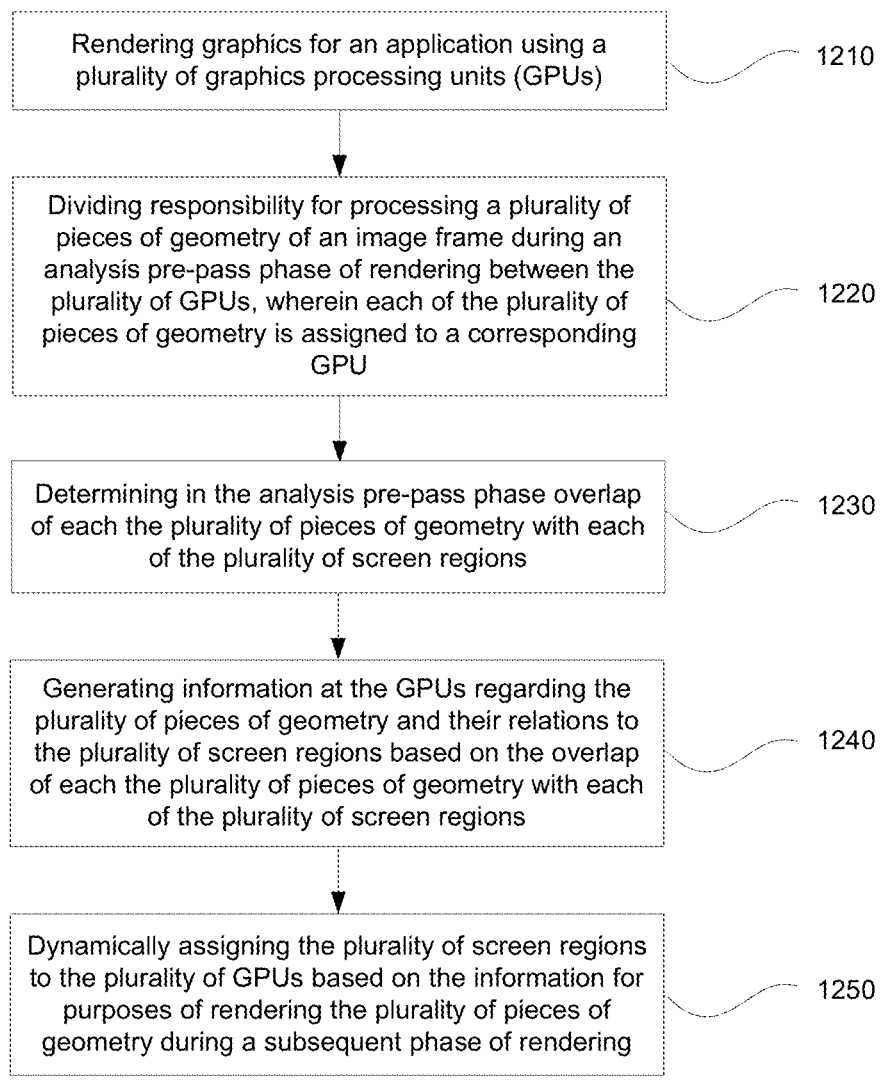
FIG. 12A is a flow diagram illustrating a method for graphics processing including multi-GPU rendering of geometry for an application by performing geometry analysis prior to rendering, in accordance with one embodiment of the present disclosure.

System and Method for Efficient Multi-GPU Rendering of Geometry by Performing Geometry Analysis Before Rendering With the detailed description of the cloud game network 190 (e.g. in the game server 160) and the GPU resources 365 of FIGS. 1-3, flow diagram 1200A of FIG. 12A illustrates a method for graphics processing including multi-GPU rendering of geometry for an application by performing geometry analysis prior to rendering, in accordance with one embodiment of the present disclosure. That is, instead of generating information while rendering as described in relation to FIGS. 7, 9 and 10, the information is generated prior to rendering, such as during a pre-pass (i.e. a pass that does not write to a Z-buffer or MRTs). It is understood that one or more of the various features and advantages of various embodiments described in relation to generating information during rendering (e.g. a Z pre-pass phase of rendering) are equally applicable to generating information before rendering (e.g., pre-pass performing geometry analysis), and may not be repeated here in an effort minimize duplication in the description. As previously described, various architectures may include multiple GPUs collaborating to render a single image by performing multi-GPU rendering of geometry for an application through region testing while rendering, such as within one or more cloud gaming servers of a cloud gaming system, or within a stand-alone system, such as a personal computer or gaming console that includes a high-end graphics card having multiple GPUs, etc.

In particular, GPU rendering responsibility is dynamically assigned between a plurality of screen regions for each image frame, such that each GPU renders objects in its assigned screen regions. Analysis is performed before geometry rendering (e.g. in a primitive shader or compute shader) to determine the spatial distribution of geometry in an image frame, and then to dynamically adjust GPU responsibility for screen regions to render objects in that image frame.

At 1210, the method includes rendering graphics for an application using a plurality of graphics processing units (GPUs). In particular, a number of GPUs collaborate to generate an image frame. In particular, multi-GPU processing is performed when rendering a single image frame and/or each of one or more image frames of a sequence of image frames for a real-time application. Responsibility for rendering is divided between a plurality of the GPUs based on screen region for each image frame, as will be further described below.

At 1220, the method includes dividing responsibility for processing a plurality of pieces of geometry of an image frame during an analysis pre-pass between the plurality of GPUs, wherein each of the plurality of pieces of geometry is assigned to a corresponding GPU. The analysis pre-pass is performed before a phase of rendering for the image frame.

In the analysis pre-pass, objects are distributed between the multiple GPUs. For example, in a multi-GPU architecture having four GPUs, each GPU processes during the analysis pre-pass approximately a quarter of the objects. As previously described, there may be a benefit to subdividing objects into smaller pieces of geometry, in one embodiment. In addition, in other embodiments the objects are dynamically assigned to GPUs per image frame. Processing efficiency may be realized when dynamically assigning pieces of geometry to the GPUs for the analysis pre-pass.

Because the analysis pre-pass is performed before a rendering phase, the processing is typically not performed in hardware. That is, the analysis pre-pass may be performed in software, such as by using a shader in various embodiments. For example, a primitive shader may be used during the analysis pre-pass, such that there is no corresponding pixel shader. In addition, a Z-buffer and/or other render targets are not written to during the analysis pre-pass. In other embodiments, a compute shader is used.

At 1230, the method includes determining in the analysis pre-pass phase overlap of each the plurality of pieces of geometry with each of the plurality of screen regions. As previously described, the piece of geometry may be an object, or portions of an object (e.g., individual primitives, groups of primitives, etc.). In one embodiment, the information generated includes an accurate representation of the overlap of each of the plurality of pieces of geometry with each of the plurality of screen regions. In another embodiment, the information includes an approximation of the overlap of each of the plurality of pieces of geometry with each of the plurality of screen regions.

At 1240, the method includes generating information regarding the plurality of pieces of geometry and their relations to a plurality of screen regions based on the overlap of each the plurality of pieces of geometry with each of the plurality of screen regions. The information may simply be that there is an overlap. The information may include the pixel area or approximate pixel area that the piece of geometry overlaps or covers in a screen region. The information may include the number of pixels written to a screen region. The information may include the number of vertices or primitives overlapping the screen region, or an approximation thereof.

At 1250, the method includes dynamically assigning the plurality of screen regions to the plurality of GPUs based on the information for purposes of rendering the plurality of pieces of geometry during a geometry pass phase of rendering. That is, the information may be used in the subsequent assignment of screen regions to the plurality of GPUs. For example, each GPU is assigned to corresponding screen regions based on the information. In that manner, each GPU has a corresponding division of the responsibility (e.g., corresponding screen regions) for rendering the image frame. As such, assignment of screen regions to GPUs may vary from image frame to image frame.

Furthermore, the method includes rendering during the geometry pass phase the plurality of pieces of geometry at each of the plurality of GPUs based on GPU to screen region assignments determined from the assigning the plurality of screen regions to the plurality of GPUs.

Figure 12B:
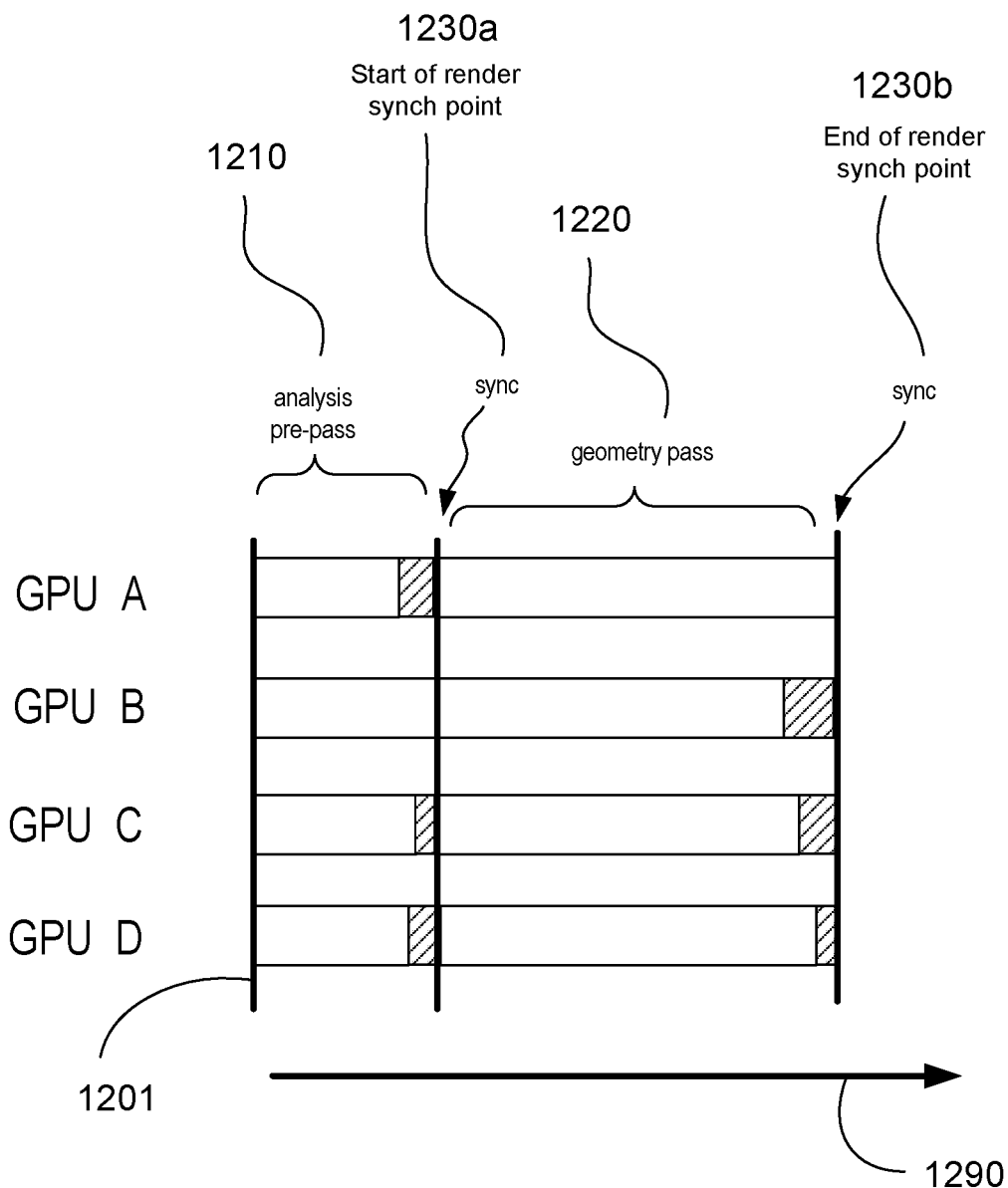
FIG. 12B is a diagram illustrating an analysis pre-pass performed before a rendering phase for an image frame, the analysis pre-pass generating information used for the dynamic assignment of screen regions to GPUs for geometry rendering of the image frame, in accordance with one embodiment of the present disclosure.

FIG. 12B is a rendering timing diagram 1200B illustrating an analysis pre-pass performed before rendering an image frame (e.g. during geometry pass phase of rendering), in accordance with one embodiment of the present disclosure. The analysis pre-pass is dedicated to the analysis of the relationship between pieces of geometry and screen regions. The analysis pre-pass generates information used for the dynamic assignment of screen regions to GPUs for geometry rendering of the image frame. In particular, rendering timing diagram 1200B illustrates the use of multiple GPUs to collaboratively render an image frame. Responsibility for rendering is divided between a plurality of the GPUs based on screen region. As previously described, prior to rendering geometry of the image frame, GPUs generate information regarding the geometry and its relation to screen regions. This information is used to assign GPUs to screen regions, allowing for more efficient rendering. For example, before rendering, a first GPU generates information about a piece of geometry and its relationship to screen regions, wherein this information is used in assigning screen regions to one or more "rendering GPUs" that render that piece of geometry.

In particular, rendering timing diagram 1200B illustrates the rendering of one or more objects by four GPUs (e.g. GPU-A, GPU-B, GPU-C, and GPU-D) with reference to timeline 1290. As previously described, the use of four GPUs is merely for purposes of illustration, such that a multi-GPU architecture may include one or more GPUs. Vertical line 1201 indicates the start of a set of rendering phases for the image frame. Vertical line 1201 also indicates the start of the analysis pre-pass 1210. In the analysis pre-pass, objects are distributed between the multiple GPUs. With four GPUs, with each GPU processing approximately a quarter of the objects. A sync point 1230a is provided so that each of the GPUs begin respective geometry pass rendering phase 1220 at the same time. That is, in one embodiment, sync operation 1230a ensures simultaneous start of the geometry pass by all GPUs. In another embodiment, the sync operation 1230a is not used, as previously described, such that the geometry pass phase of rendering may begin for any GPU that finishes the analysis pre-pass, and without waiting for all the other GPUs to finish their corresponding analysis pre-passes.

Sync point 1230b indicates the end of the geometry pass phase of rendering for the current image frame, and is also provided so that each of the GPUs can continue with subsequent phases of rendering for the current frame at the same time, or begin rendering the next image frame at the same time.

In one embodiment, a single command buffer is used by the multiple GPUs to render the corresponding image frame. The rendering command buffer may include commands to set state and commands to execute primitive shaders or computer shaders, in order to perform an analysis pre-pass. A sync operation may be included within the command buffer to synchronize the start of various operations by the GPUs. For example, a sync operation may be used to synchronize the start of the geometry pass phase of rendering by the GPUs. As such, the command buffer may include draw calls and state settings for each object to perform the geometry pass phase of rendering.

In one embodiment, the generation of the information is accelerated though use of a dedicated instruction or instructions. That is, the shaders that generate the information use one or more dedicated instructions to accelerate the generation of the information regarding the piece of geometry and its relation to screen regions.

Figure 13A:
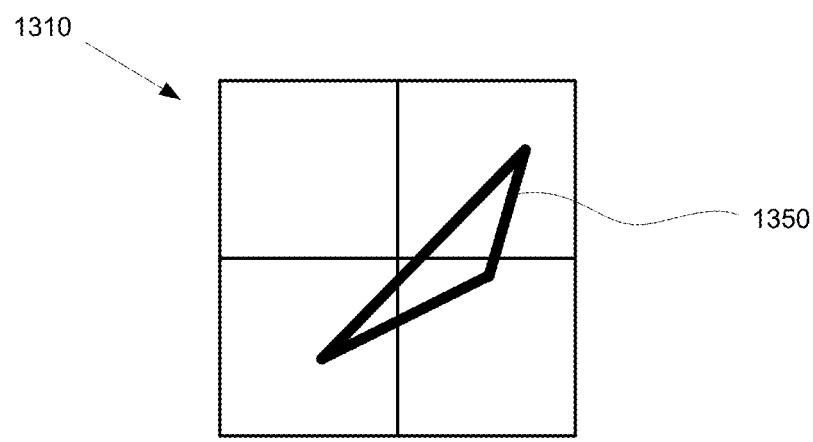
FIG. 13A is a diagram illustrating the calculation of an accurate overlapping between a piece of geometry and a screen region when performing an analysis pre-pass to generate information used for the dynamic assignment of screen regions to GPUs for geometry rendering of the image frame, in accordance with one embodiment of the present disclosure.

In one embodiment, the instruction may calculate accurate overlap between a primitive of a piece of geometry and each of the screen regions. For example, FIG. 13A is a diagram 1310 illustrating the calculation of an accurate overlapping between a primitive 1350 and one or more screen regions when performing an analysis pre-pass to generate information used for the dynamic assignment of screen regions to GPUs for geometry rendering of the image frame, in accordance with one embodiment of the present disclosure. For example, the primitive 1350 is shown overlapping three different regions, wherein overlap of respective portions of primitive 1350 is accurately determined for each of the regions.

In other embodiments, to reduce complexity of the instruction implementation, this instruction might perform an approximation of the area of overlap, wherein the information includes an approximate area that a primitive overlaps a screen region or regions. In particular, the instruction may calculate an approximate overlap between a primitive of a piece of geometry and one or more of the screen regions. For example, FIG. 13B is a pair of diagrams illustrating the calculation of approximate overlapping between a piece of geometry and a number of screen regions when performing an analysis pre-pass to generate information used for the dynamic assignment of screen regions to GPUs for geometry rendering of the image frame, in accordance with one embodiment of the present disclosure.

Figure 13B:
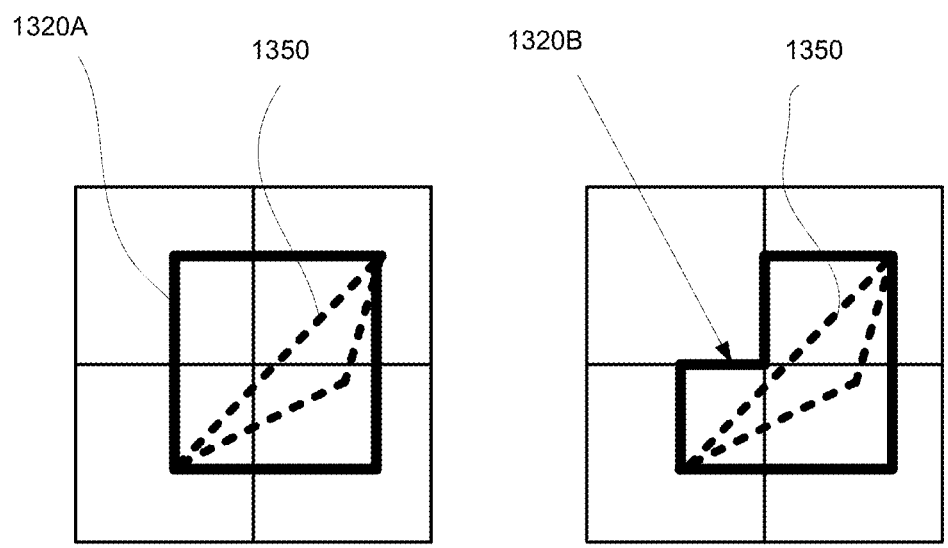
FIG. 13B is a pair of diagrams illustrating the calculations of approximate overlap between a piece of geometry and a screen region when performing an analysis pre-pass to generate information used for the dynamic assignment of screen regions to GPUs for geometry rendering of the image frame, in accordance with one embodiment of the present disclosure.

As shown in the left hand diagram in FIG. 13B, the instruction may use a bounding box of a primitive. As such, the overlap of the bounding box of the primitive 1350 and one or more screen regions is determined. Boundary 1320A indicates the approximate overlap of the piece of geometry 1350 as determined through analysis of bounding boxes.

In the right hand diagram of FIG. 13B, the instruction checks screen regions against the primitive, such that screen regions with no overlapping of pieces of geometry are excluded, and a bounding box is generated for the portion of the primitive that overlaps each screen region. Boundary 1320B indicates the approximate overlap of the primitive 1350 as determined through analysis of bounding boxes and overlap filtering. Note that boundary box 1320B of the right hand diagram of FIG. 13B is smaller than boundary box 1320A of the left hand diagram of FIG. 13B.

In yet other embodiments, to further reduce the complexity of the instruction, the instruction might generate presence information, such as whether a piece of geometry is present in screen regions. For example, the presence information may indicate whether a primitive of a piece of geometry overlaps the screen region. The information may include an approximate presence of the piece of geometry in corresponding screen regions.

In another embodiment, the shader does not allocate space in the position or parameter caches. That is, the shader does not perform allocations of the positions or parameter caches, thereby allowing for a higher degree of parallelism when performing the analysis pre-pass. This also leads to a corresponding reduction in time required for the analysis pre-pass.

In another embodiment, a single shader is used to perform either the analysis performed in the analysis pre-pass, or the rendering in the geometry pass. For example, the shader that generates information may be configurable to output information regarding the piece of geometry and its relation to screen regions, or to output vertex position and parameter information by use by later rendering stages. This may be accomplished in a variety of ways, such as via external hardware state that the shader could check (e.g. setting a hardware register), or via an input to the shader. The result is that the shader performs two different functions to render a corresponding image frame.

As previously described, prior to commencement of the geometry pass phase of rendering, the information is used to assign regions to GPUs. Information generated during the rendering of a previous frame (e.g. actual pixel count shaded while rendering pieces of geometry) may also be used for assigning screen regions to GPUs. The information from the prior frame may include actual number of pixels that are shaded per piece of geometry per screen region, for example. That is, the screen regions are assigned to GPUs based on the information generated from a previous image frame (e.g. GPU usage) and the information generated during the analysis pre-pass.

Figure 14A:
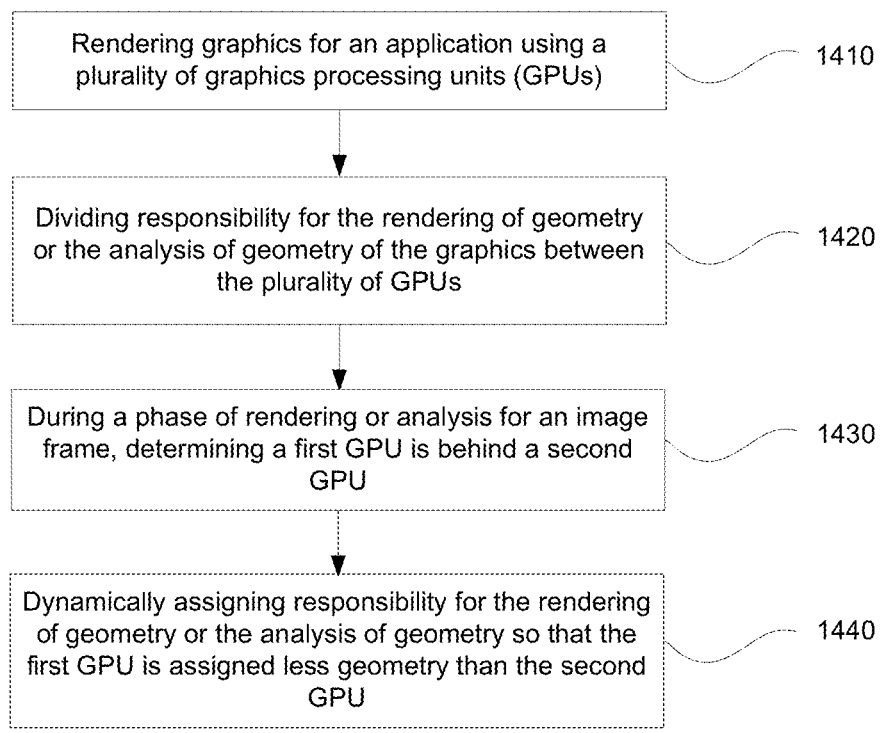
FIG. 14A is a flow diagram illustrating a method for graphics processing including multi-GPU rendering of geometry for an application by performing a timing analysis during a rendering or analysis phase for purposes of redistributing the assignment of GPU responsibilities during the rendering or analysis phase, such as when performing a Z pre-pass phase for pieces of geometry to generate information used for the dynamic assignment of screen regions to GPUs for geometry rendering of the image frame, in accordance with one embodiment of the present disclosure.
Figure 14B:
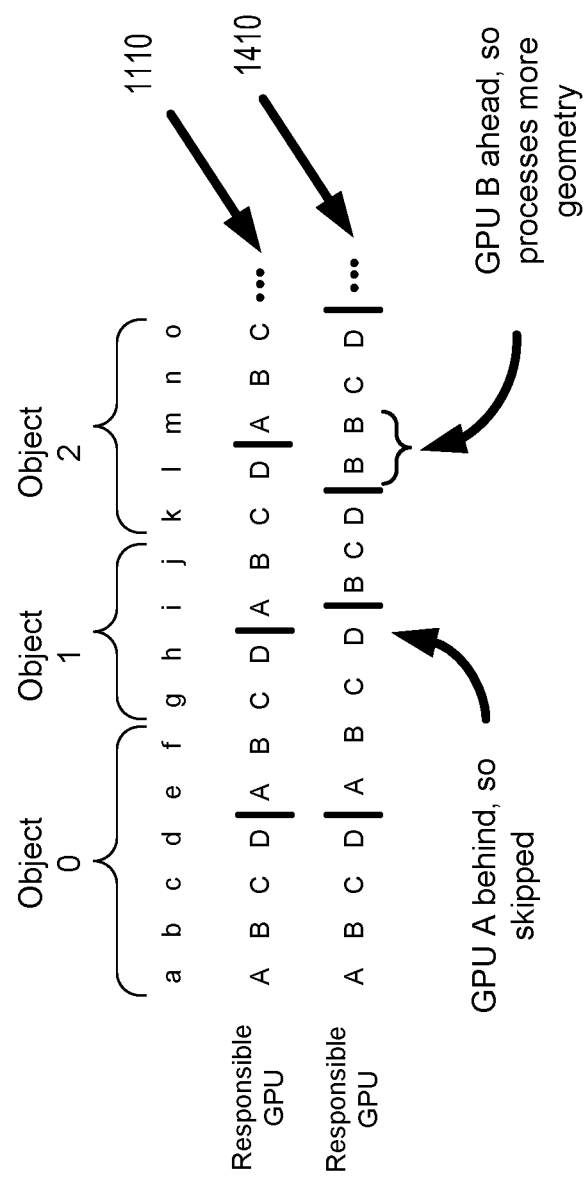
FIG. 14B is a diagram illustrating various distributions of GPU assignments for performing a Z pre-pass phase of rendering to generate information used for the dynamic assignment of screen regions to GPUs for geometry rendering of the image frame, in accordance with one embodiment of the present disclosure.

System and Method for Efficient Multi-GPU Rendering of Geometry by Subdividing Geometry With the detailed description of the cloud game network 190 (e.g. in the game server 160) and the GPU resources 365 of FIGS. 1-3, line 1110 of FIG. 14B illustrates a method for graphics processing including multi-GPU rendering of an application by subdividing geometry. Objects 0, 1, and 2 represent the geometry used by or generated by an individual draw call. Rather than distribute whole objects (i.e. draw calls) to GPU-A, GPU-B, GPU-C and GPU-D, instead the GPUs divide each object into smaller pieces of geometry, such as pieces roughly the size at which the position and/or parameter caches are allocated. Purely for illustration, object 0 is split into pieces "a", "b", "c", "d", "e" and "f", such as object 610 in FIG. 6B. Also, object 1 is split into pieces "g", "h", and "i". Further, object 2 is split into pieces "j", "k", "l", "m", "n", and "o". Distribution 1110 (e.g. the ABCD-ABCDABCD . . . row) shows an even distribution of the responsibility for rendering (or a phase or rendering) between a plurality of GPUs. As this distribution is finer grained than whole objects (i.e. draw calls), the imbalance in rendering time between GPUs is reduced and the total time to render (or the time for a phase of rendering) is reduced. Flow diagram 1400A of FIG. 14A and line 1410 of FIG. 14B illustrate a method for graphics processing including multi-GPU rendering of geometry for an application by performing a timing analysis during a rendering phase for purposes of redistributing the assignment of GPU responsibilities during the rendering phase. It is understood that one or more of the various features and advantages of various embodiments described in relation to generating information before and during rendering and the geometry pass phases of rendering of FIGS. 7-13 are equally applicable for use when subdividing geometry and/or performing a timing analysis, and may not be repeated here in an effort minimize duplication in the description. As previously described, various architectures may include multiple GPUs collaborating to render a single image by performing multi-GPU rendering of geometry for an application through region testing while rendering, such as within one or more cloud gaming servers of a cloud gaming system, or within a stand-alone system, such as a personal computer or gaming console that includes a high-end graphics card having multiple GPUs, etc.

In some embodiments, GPU rendering responsibility is fixedly or dynamically assigned between a plurality of screen regions for each image frame, such that each GPU renders objects in its assigned screen regions, as previously described in relation to FIGS. 7-13. In other embodiments, each GPU renders to its own Z-buffers or other render targets. Timing analysis is performed during one or more of the phases of rendering (e.g., geometry pre-pass analysis, Z pre-pass, or geometry rendering) for purposes of redistributing the assignment of GPU responsibilities during those phases. That is, a timing analysis is performed during a rendering phase for purposes of redistributing the assignment of GPU responsibilities during the rendering phase, such as when performing a Z pre-pass phase for pieces of geometry to generate information used for the dynamic assignment of screen regions to GPUs for geometry rendering of the image frame, in one implementation. For example, a screen region initially assigned to one GPU may be reassigned to another GPU during a phase of rendering (e.g., one GPU may be lagging behind other GPUs during that phase).

At 1410, the method includes rendering graphics for an application using a plurality of graphics processing units (GPUs). In particular, multi-GPU processing is performed when rendering a single image frame and/or each of one or more image frames of a sequence of image frames for a real-time application. That is, the plurality of GPUs act in collaboration to render a corresponding image frame including a plurality of pieces of geometry.

At 1420, the method includes dividing responsibility for the rendering of geometry of the graphics between the plurality of GPUs based on a plurality of screen regions. That is, each GPU has a corresponding division of the responsibility (e.g., corresponding set of screen regions).

While rendering the geometry or performing analysis of the geometry, the amount of time taken in rendering or analysis is used to tune the division of responsibility with regards to the objects. In particular, at 1430, the method includes during a phase of rendering or analysis for an image frame, determining a first GPU is behind at least one other GPU, such as a second GPU. At 1440, the method includes dynamically assigning geometry in such a way that the first GPU is assigned less than the second GPU.

For example, the dynamic assignment of geometry may be performed during the generation of a Z-buffer, for purposes of illustration. Dynamic assignment of geometry may be performed during analysis pre-pass and/or geometry pass phase of rendering. In the case of dynamic assignment of geometry during the generation of the Z-buffer and Z pre-pass analysis, one or more Z-buffers are generated by multiple GPUs and/or merged in collaboration for an image frame during a Z pre-pass phase of rendering. In particular, pieces of geometry are divided between the GPUs for processing the Z pre-pass phase of rendering, wherein each of the plurality of pieces of geometry is assigned to a corresponding GPU. Instead of using the hardware during the Z pre-pass phase to generate information used to optimize rendering of the corresponding image frame, the hardware may be configured to perform an analysis pre-pass to generate information that is used to optimize the rendering speed of a subsequent geometry pass, for example.

In particular, objects may be subdivided into smaller pieces, as previously described in FIG. 6B. Responsibility for rendering of pieces of geometry in the Z pre-pass phase of rendering is distributed between GPUs in an interleaved fashion as previously described in relation to distribution 1110 of FIG. 14B which shows various distributions of GPU assignments for performing a Z pre-pass phase of rendering to generate information used for the dynamic assignment of screen regions to GPUs for geometry rendering of the image frame. Distribution 1110 shows the distribution of rendering responsibilities between multiple GPUs for the Z pre-pass. As previously described, each GPU is assigned to a corresponding portion of the geometry of an image frame, wherein that portion may be further partitioned into pieces of geometry. Because successive pieces of geometry are assigned to different GPUs, as shown in distribution 1110, the result is that the rendering time during the Z pre-pass is roughly balanced.

Further balancing of rendering time between GPUs can be achieved through dynamic adjustment of the responsibility of rendering pieces of geometry as shown in distribution 1410. That is the distribution of pieces of geometry to GPUs when performing the Z pre-pass phase of rendering is dynamically adjusted during that phase of rendering. For example, distribution 1410 [ABCDABCDBCDBBCD row] shows an asymmetric distribution of the responsibility for performing the Z pre-pass phase between a plurality of GPUs. For example, the asymmetric distribution may be advantageous when certain GPUs have been assigned pieces of geometry that are larger than those assigned to other GPUs, and therefore are behind in the Z pre-pass relative to the other GPUs.

As shown in distribution 1410, GPU A is taking more time to render the pieces of geometry during the Z pre-pass phase, so it is skipped when assigning pieces of geometry to GPUs. For example, instead of having GPU-A process piece of geometry "i" for object 1 during Z pre-pass rendering, GPU-B is assigned to render the piece of geometry during the Z pre-pass phase. As such, GPU-B is assigned more pieces of geometry than GPU-A during the Z pre-pass phase of rendering. In particular, the piece of geometry is unassigned from the first GPU and then assigned to the second GPU during the Z pre-pass phase of rendering. In addition, GPU B is ahead of the other GPUs, so it is able to process more geometry during the Z pre-pass phase. That is, distribution 1410 shows the repeated assignment of GPU-B to successive pieces of geometry for Z pre-pass rendering. For example, GPU-B is assigned to process pieces of geometry "1" and "m" for object 2 during the Z pre-pass phase.

Though the above is presented in terms of "dynamic assignment" of geometry, it is equally valid to view this in terms of "assignment" and "reassignment." For example, as shown in distribution 1410, GPU A is taking more time to render the pieces of geometry during the Z pre-pass phase, so it is re-assigned. For example, instead of having GPU-A process piece of geometry "i" for object 1 during Z pre-pass rendering, GPU-B is assigned to render the piece of geometry during the Z pre-pass phase, wherein GPU-A may have originally been assigned for rendering that piece of geometry. In addition, GPU B is ahead of the other GPUs, so it is able to process more geometry during the Z pre-pass phase. That is, distribution 1410 shows the repeated assignment or re-assignment of GPU-B to successive pieces of geometry for Z pre-pass rendering. For example, GPU-B is assigned to process pieces of geometry "1" and "m" for object 2 during the Z pre-pass phase. That is, GPU-B is assigned to render piece of geometry "1" for object 2, even though that piece of geometry may have been initially assigned to GPU-A. As such, the piece of geometry originally assigned to a first GPU is re-assigned to a second GPU (which may be ahead in rendering) during the Z pre-pass phase of rendering.

Though the assignment of pieces of geometry during the Z pre-pass phase to GPUs may not be balanced, the processing during the Z pre-pass phase performed by the GPUs may turn out to be roughly balanced (e.g. each GPU spends approximately the same amount of time to perform Z pre-pass phase of rendering).

In another embodiment, the dynamic assignment of geometry may be performed during the geometry pass phase of rendering of an image frame. For example, screen regions are assigned to GPUs during the geometry pass phase of rendering based on information generated during a Z pre-pass or analysis pre-pass. A screen region assigned to one GPU may be reassigned to another GPU during the rendering phase. This may increase efficiency, as GPUs that are ahead of others may be allocated additional screen regions, and those GPUs that are behind others may avoid being allocated additional screen regions. In particular, a plurality of GPUs in collaboration generates a Z-buffer for an image frame during a Z pre-pass phase of rendering. Information is generated regarding pieces of geometry of the image frame and their relations to a plurality of screen regions during this Z pre-pass. Screen regions are assigned to the GPUs based on the information for purposes of rendering the image frame during a geometry pass phase of rendering. The GPUs render the pieces of geometry during the geometry pass phase of rendering based on GPU to screen region assignments. A timing analysis is performed during the geometry pass phase of rendering, which may result in reassigning a first piece of geometry initially assigned to a first GPU for rendering during the geometry pass phase to the second GPU. For example, the first GPU may be behind in processing the geometry pass phase of rendering, in one embodiment. In another embodiment, the second GPU may be ahead in processing the geometry pass phase of rendering.

Figure 15A:
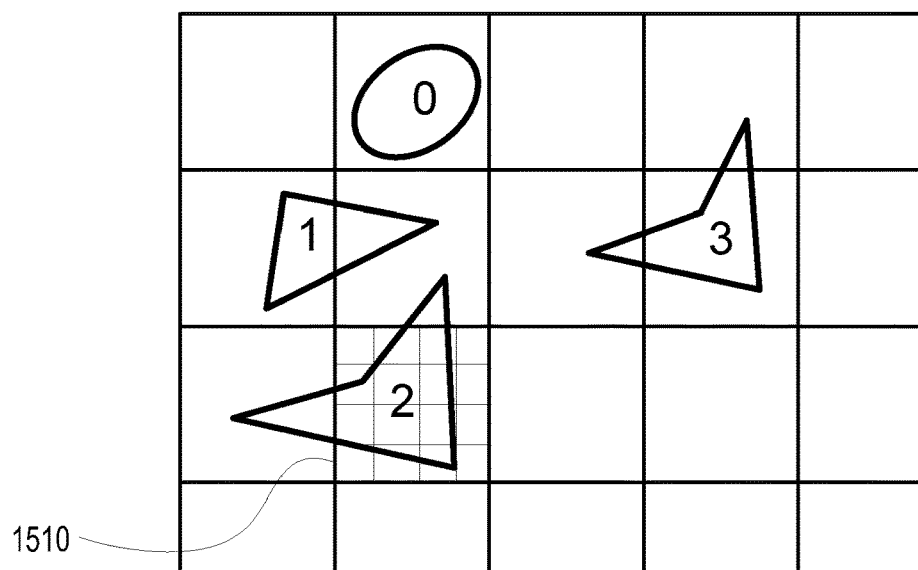
FIG. 15A is a diagram illustrating the use of multiple GPUs to render pieces of geometry in a screen region, in accordance with one embodiment of the present disclosure.
Figure 15B:
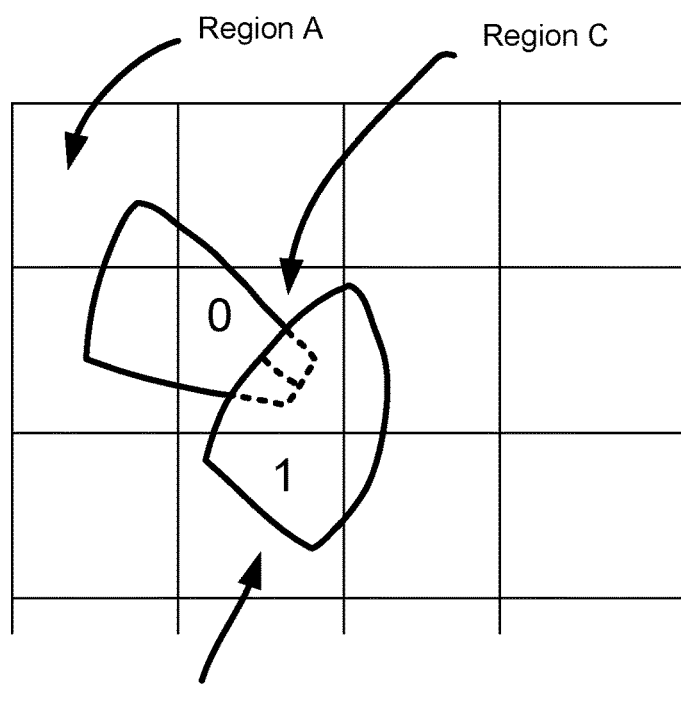
FIG. 15B is a diagram illustrating the rendering of pieces of geometry out of order of their corresponding draw calls, in accordance with one embodiment of the present disclosure.

FIGS. 15A-15B show various screen region allocation strategies, which may be applied to rendering of image frames described previously in relation to FIGS. 7-14.

In particular, FIG. 15A is a diagram illustrating the use of multiple GPUs to render pieces of geometry (e.g., geometry related to objects 0-3) in a particular screen region, in accordance with one embodiment of the present disclosure. That is, screen region 1510 may be assigned to multiple GPUs for rendering. For example, this may increase efficiency, such as when there is very dense geometry late within the rendering phase. Assigning the screen region 1510 to multiple GPUs typically requires subdivision of the screen regions, so that each GPU may be responsible for a portion or portions of the screen region.

FIG. 15B is a diagram illustrating the rendering of pieces of geometry out of order of their corresponding draw calls, in accordance with one embodiment of the present disclosure. In particular, the rendering order of the pieces of geometry may not match the order of their corresponding draw calls in a corresponding command buffer. As shown in this example, object 0 precedes object 1 in the rendering command buffer. However, object 0 and 1 intersect, such as within screen region C. In that case, strict ordering of rendering may need to be observed for region C. That is, object 0 must be rendered before object 1 in region C.

On the other hand, objects in region A and region B may be rendered in any order because there is no intersecting. That is object 1 may precede object 0, or vice versa, when rendering region A and/or region B.

In still another embodiment, if the rendering command buffer can be traversed multiple times, it is possible to render certain screen regions on a first traversal (e.g. high cost regions) and render remaining regions (e.g. low cost regions) on second or subsequent traversals. The resulting rendering order of pieces of geometry may not match the order of their corresponding draw calls, such as when the first object is rendered on the second traversal). This strategy increases efficiency when rendering a corresponding image frame, as load balancing between GPUs is easier for low cost regions than it is for high cost regions.

Figure 16:
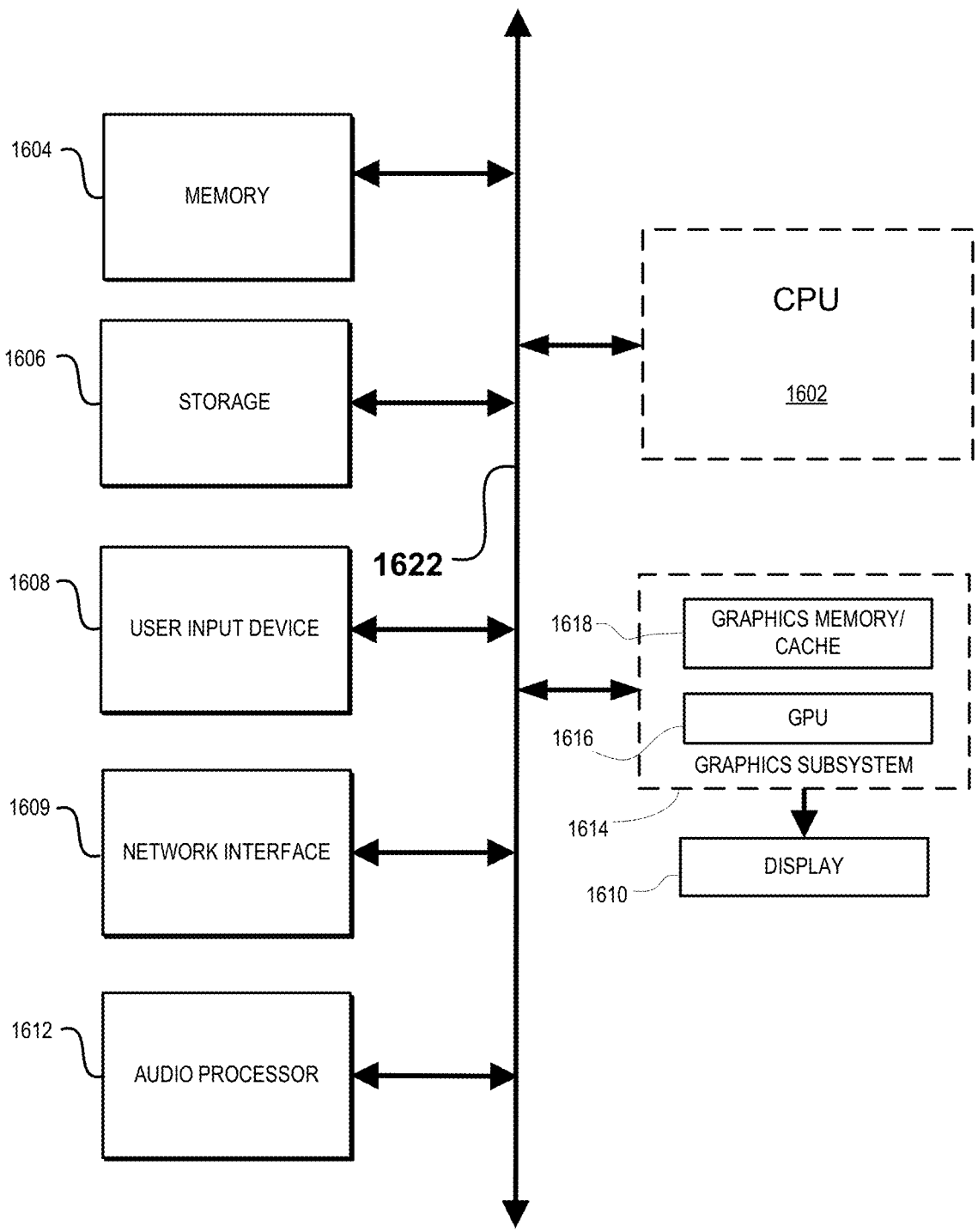
FIG. 16 illustrates components of an example device that can be used to perform aspects of the various embodiments of the present disclosure.

FIG. 16 illustrates components of an example device 1600 that can be used to perform aspects of the various embodiments of the present disclosure. For example, FIG. 16 illustrates an exemplary hardware system suitable for multi-GPU rendering of geometry for an application by performing geometry analysis while rendering to dynamically assign screen regions to GPUs for geometry rendering of the image frame, and/or by performing geometry analysis prior to rendering to dynamically assign screen regions to GPUs for geometry rendering of the image frame, and/or by subdividing pieces of geometry and assigning the resulting smaller portions of geometry to multiple GPUs, in accordance with embodiments of the present disclosure. This block diagram illustrates a device 1600 that can incorporate or can be a personal computer, a server computer, gaming console, mobile device, or other digital device, each of which is suitable for practicing an embodiment of the invention. Device 1600 includes a central processing unit (CPU) 1602 for running software applications and optionally an operating system. CPU 1602 may be comprised of one or more homogeneous or heterogeneous processing cores.

In accordance with various embodiments, CPU 1602 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for graphics processing during execution of a game.

Memory 1604 stores applications and data for use by the CPU 1602 and GPU 1616. Storage 1606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1608 communicate user inputs from one or more users to device 1600, examples of which may include keyboards, mice, joysticks, touch pads, touch screens, still or video recorders/cameras, and/or microphones. Network interface 1609 allows device 1600 to communicate with other computer systems via an electronic communications network, and may include wired or wireless communication over local area networks and wide area networks such as the internet. An audio processor 1612 is adapted to generate analog or digital audio output from instructions and/or data provided by the CPU 1602, memory 1604, and/or storage 1606. The components of device 1600, including CPU 1602, graphics subsystem including GPU 1616, memory 1604, data storage 1606, user input devices 1608, network interface 1609, and audio processor 1612 are connected via one or more data buses 1622.

A graphics subsystem 1614 is further connected with data bus 1622 and the components of the device 1600. The graphics subsystem 1614 includes at least one graphics processing unit (GPU) 1616 and graphics memory 1618. Graphics memory 1618 includes a display memory (e.g. a frame buffer) used for storing pixel data for each pixel of an output image. Graphics memory 1618 can be integrated in the same device as GPU 1616, connected as a separate device with GPU 1616, and/or implemented within memory 1604. Pixel data can be provided to graphics memory 1618 directly from the CPU 1602. Alternatively, CPU 1602 provides the GPU 1616 with data and/or instructions defining the desired output images, from which the GPU 1616 generates the pixel data of one or more output images. The data and/or instructions defining the desired output images can be stored in memory 1604 and/or graphics memory 1618. In an embodiment, the GPU 1616 includes 3D rendering capabilities for generating pixel data for output images from instructions and data defining the geometry, lighting, shading, texturing, motion, and/or camera parameters for a scene. The GPU 1616 can further include one or more programmable execution units capable of executing shader programs.

The graphics subsystem 1614 periodically outputs pixel data for an image from graphics memory 1618 to be displayed on display device 1610, or to be projected by a projection system (not shown). Display device 1610 can be any device capable of displaying visual information in response to a signal from the device 1600, including CRT, LCD, plasma, and OLED displays. Device 1600 can provide the display device 1610 with an analog or digital signal, for example.

Other embodiments for optimizing the graphics subsystem 1614 could include multi-GPU rendering of geometry for an application by pretesting the geometry against interleaved screen regions before rendering objects for an image frame. The graphics subsystem 1614 could be configured as one or more processing devices.

For example, the graphics subsystem 1614 may be configured to perform multi-GPU rendering of geometry for an application by region testing while rendering, wherein multiple graphics subsystems could be implementing graphics and/or rendering pipelines for a single application, in one embodiment. That is, the graphics subsystem 1614 includes multiple GPUs used for rendering an image or each of one or more images of a sequence of images when executing an application.

In other embodiments, the graphics subsystem 1614 includes multiple GPU devices, which are combined to perform graphics processing for a single application that is executing on a corresponding CPU. For example, the multiple GPUs can perform multi-GPU rendering of geometry for an application by region testing while rendering of objects for an image. In other examples, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g. if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g. a first shader operation) and compositing of outputs from slave GPU 2 and slave GPU 3, wherein slave GPU 2 could perform a second shader (e.g. fluid effects, such as a river) operation, the slave GPU 3 could perform a third shader (e.g. particle smoke) operation, wherein master GPU 1 composites the results from each of GPU 1, GPU 2, and GPU 3. In that manner, different GPUs can be assigned to perform different shader operations (e.g. flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, the present disclosure describes methods and systems configured for multi-GPU rendering of geometry for an application by performing geometry analysis while rendering to dynamically assign screen regions to GPUs for geometry rendering of the image frame, and/or by performing geometry analysis prior to rendering to dynamically assign screen regions to GPUs for geometry rendering of the image frame, and/or by subdividing pieces of geometry and assigning the resulting smaller portions of geometry to multiple.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for graphics processing, comprising:
rendering graphics for an application using a plurality of graphics processing units (GPUs);
using the plurality of GPUs in collaboration to render an image frame including a plurality of pieces of geometry;
during the rendering of the image frame, subdividing one or more of the plurality of pieces of geometry into a plurality of smaller portions of geometry, and dividing responsibility for rendering the plurality of smaller portions of geometry among the plurality of GPUs, wherein each of the plurality of smaller portions of geometry is processed by a first corresponding GPU;
for those pieces of geometry that are not subdivided, dividing responsibility for rendering the pieces of geometry that are not subdivided among the plurality of GPUs, wherein each of the pieces of geometry that are not subdivided is processed by a second corresponding GPU; and
reassigning a piece of geometry or a smaller portion of geometry initially assigned to a first GPU for rendering during a phase of rendering of the image frame to a second GPU based on rendering timing information for the plurality of GPUs determined for the phase of rendering.

2. The method of claim 1,
wherein the phase of rendering for the image frame includes a geometry analysis phase of rendering, or a Z pre-pass phase of rendering, or a geometry pass phase of rendering.

3. The method of claim 2, further comprising:
during the geometry analysis phase of rendering, or the Z pre-pass phase of rendering, or the geometry pass phase of rendering, determining the first GPU is behind the second GPU; and
dynamically assigning responsibility for rendering the plurality of pieces of geometry so that the first GPU is assigned less pieces of geometry than the second GPU.

4. The method of claim 1, further comprising:
using the plurality of GPUs in collaboration to generate a Z-buffer for the image frame including the plurality of pieces of geometry during a Z pre-pass phase of rendering;
generating information during the Z pre-pass phase of rendering regarding the plurality of pieces of geometry of the image frame and their relations to a plurality of screen regions;
assigning the plurality of screen regions to the plurality of GPUs based on the information for purposes of rendering the image frame during a geometry pass phase of rendering;
rendering during the geometry pass phase of rendering the plurality of pieces of geometry at each of the plurality of GPUs based on GPU to screen region assignments determined from the assigning the plurality of screen regions to the plurality of GPUs; and
reassigning the piece of geometry initially assigned to the first GPU for rendering during the geometry pass phase to the second GPU.

5. The method of claim 1,
wherein a rendering command buffer is shared between the plurality of GPUs as a common rendering command buffer,
wherein a format of the common rendering command buffer allows a command to be executed only by a subset of the plurality of GPUs.

6. The method of claim 1,
wherein one or more of the plurality of GPUs are portions of a larger GPU that is configured as a plurality of virtual GPUs.

7. A computer system comprising:
a processor; and
memory coupled to the processor and having stored therein instructions that, if executed by the computer system, cause the computer system to execute a method for graphics processing, comprising:
rendering graphics for an application using a plurality of graphics processing units (GPUs);
using the plurality of GPUs in collaboration to render an image frame including a plurality of pieces of geometry;
during the rendering of the image frame, subdividing one or more of the plurality of pieces of geometry into a plurality of smaller portions of geometry, and dividing responsibility for rendering the plurality of smaller portions of geometry among the plurality of GPUs, wherein each of the plurality of smaller portions of geometry is processed by a first corresponding GPU;
for those pieces of geometry that are not subdivided, dividing the responsibility for rendering the pieces of geometry among the plurality of GPUs, wherein each of these pieces of geometry is processed by a second corresponding GPU; and
reassigning a piece of geometry or a smaller portion of geometry initially assigned to a first GPU for rendering during a phase of rendering of the image frame to a second GPU based on rendering timing information for the plurality of GPUs determined for the phase of rendering.

8. The computer system of claim 7,
wherein in the method the phase of rendering for the image frame includes a geometry analysis phase of rendering, or a Z pre-pass phase of rendering, or a geometry pass phase of rendering.

9. The computer system of claim 8, the method further comprising:
during the geometry analysis phase of rendering, or the Z pre-pass phase of rendering, or the geometry pass phase of rendering, determining the first GPU is behind the second GPU; and
dynamically assigning responsibility for rendering the plurality of pieces of geometry so that the first GPU is assigned less pieces of geometry than the second GPU.

10. The computer system of claim 7, the method further comprising:
using the plurality of GPUs in collaboration to generate a Z-buffer for the image frame including the plurality of pieces of geometry during a Z pre-pass phase of rendering;
generating information during the Z pre-pass phase of rendering regarding the plurality of pieces of geometry of the image frame and their relations to a plurality of screen regions; and
assigning the plurality of screen regions to the plurality of GPUs based on the information for purposes of rendering the image frame during a geometry pass phase of rendering;
rendering during the geometry pass phase of rendering the plurality of pieces of geometry at each of the plurality of GPUs based on GPU to screen region assignments determined from the assigning the plurality of screen regions to the plurality of GPUs; and reassigning the piece of geometry initially assigned to the first GPU for rendering during the geometry pass phase to the second GPU.

11. The computer system of claim 7,
wherein in the method a rendering command buffer is shared between the plurality of GPUs as a common rendering command buffer,
wherein in the method a format of the common rendering command buffer allows a command to be executed only by a subset of the plurality of GPUs.

12. The computer system of claim 7, wherein in the method one or more of the plurality of GPUs are portions of a larger GPU that is configured as a plurality of virtual GPUs.

13. A non-transitory computer-readable medium storing a computer program for graphics processing, the computer readable medium comprising:
program instructions for rendering graphics for an application using a plurality of graphics processing units (GPUs);
program instructions for using the plurality of GPUs in collaboration to render an image frame including a plurality of pieces of geometry;
program instructions for during the rendering of the image frame, subdividing one or more of the plurality of pieces of geometry into a plurality of smaller portions of geometry, and dividing responsibility for rendering the plurality of smaller portions of geometry among the plurality of GPUs, wherein each of the plurality of smaller portions of geometry is processed by a first corresponding GPU;
for those pieces of geometry that are not subdivided, program instructions for dividing responsibility for rendering the pieces of geometry that are not subdivided among the plurality of GPUs, wherein each of the pieces of geometry that are not subdivided is processed by a second corresponding GPU; and
reassigning a piece of geometry or a smaller portion of geometry initially assigned to a first GPU for rendering during a phase of rendering of the image frame to a second GPU based on rendering timing information for the plurality of GPUs determined for the phase of rendering.

14. The non-transitory computer-readable medium of claim 13,
wherein in the method the phase of rendering for the image frame includes a geometry analysis phase of rendering, or a Z pre-pass phase of rendering, or a geometry pass phase of rendering.

15. The non-transitory computer-readable medium of claim 14, further comprising:
during the geometry analysis phase of rendering, or the Z pre-pass phase of rendering, or the geometry pass phase of rendering, determining the first GPU is behind the second GPU; and
dynamically assigning responsibility for rendering the plurality of pieces of geometry so that the first GPU is assigned less pieces of geometry than the second GPU.

16. The non-transitory computer-readable medium of claim 13, further comprising:

program instructions for using the plurality of GPUs in collaboration to generate a Z-buffer for the image frame including the plurality of pieces of geometry during a Z pre-pass phase of rendering;
program instructions for generating information during the Z pre-pass phase of rendering regarding the plurality of pieces of geometry of the image frame and their relations to a plurality of screen regions;
program instructions for assigning the plurality of screen regions to the plurality of GPUs based on the information for purposes of rendering the image frame during a geometry pass phase of rendering;
program instructions for rendering during the geometry pass phase of rendering the plurality of pieces of geometry at each of the plurality of GPUs based on GPU to screen region assignments determined from the assigning the plurality of screen regions to the plurality of GPUs; and
program instructions for reassigning the piece of geometry initially assigned to the first GPU for rendering during the geometry pass phase to the second GPU.

17. The non-transitory computer-readable medium of claim 13,
wherein in the method a rendering command buffer is shared between the plurality of GPUs as a common rendering command buffer,
wherein in the method a format of the common rendering command buffer allows a command to be executed only by a subset of the plurality of GPUs.

18. A method for graphics processing, comprising:
rendering graphics for an application using a plurality of graphics processing units (GPUs);
using the plurality of GPUs in collaboration to render an image frame including a plurality of pieces of geometry;
during rendering of the image frame, dividing responsibility for rendering the plurality of pieces of geometry among the plurality of GPUs, wherein each of the plurality of pieces of geometry is processed by a corresponding GPU;
generating information during a Z pre-pass phase of rendering related to each of the plurality of pieces of geometry and its relation to a plurality of screen regions;
assigning the plurality of screen regions to the plurality of GPUs for rendering during a geometry pass phase of rendering based on the information; and
reassigning a piece of geometry initially assigned to a first GPU for rendering during the geometry phase of rendering to a second GPU.

19. The method of claim 18, wherein the reassigning is based on rendering timing information for the plurality of GPUs determined for the geometry pass phase of rendering.

20. The method of claim 18, wherein the piece of geometry is assigned to the first GPU based on screen region to GPU assignments determined from the assigning the plurality of screen regions to the plurality of GPUs.

* * * * *